(12) United States Patent
Tabata

(10) Patent No.: US 8,231,835 B2
(45) Date of Patent: Jul. 31, 2012

(54) MAT PRODUCT, MANUFACTURING METHOD OF THE MAT PRODUCT, EXHAUST GAS TREATING APPARATUS, AND MUFFLER APPARATUS

(75) Inventor: Hiroki Tabata, Takahama (JP)

(73) Assignee: Ibiden Co., Ltd., Gifu (JP)

( * ) Notice: Subject to any disclaimer, the term of this patent is extended or adjusted under 35 U.S.C. 154(b) by 416 days.

(21) Appl. No.: 12/542,002

(22) Filed: Aug. 17, 2009

(65) Prior Publication Data
US 2010/0071356 A1   Mar. 25, 2010

(30) Foreign Application Priority Data

Sep. 25, 2008 (JP) .................. 2008-246738
May 8, 2009 (JP) .................. 2009-113805

(51) Int. Cl.
*B01D 50/00* (2006.01)
(52) U.S. Cl. ...................................... 422/179
(58) Field of Classification Search ............. 422/177, 422/179, 180; 428/116
See application file for complete search history.

(56) References Cited

U.S. PATENT DOCUMENTS
4,929,429 A * 5/1990 Merry .......................... 422/179

FOREIGN PATENT DOCUMENTS

| CN | 101229697 | 7/2008 |
|---|---|---|
| EP | 0192417 | 8/1986 |
| EP | 299626 A2 * | 1/1989 |
| EP | 1 267 048 A1 | 12/2002 |
| EP | 1 329 601 A1 | 7/2003 |
| EP | 1 731 729 A1 | 12/2006 |
| EP | 1 867 847 A1 | 12/2007 |
| EP | 1 895 119 A1 | 3/2008 |
| EP | 1 950 035 A1 | 7/2008 |
| JP | 2002-302875 | 10/2002 |
| WO | WO 9119082 A1 * | 12/1991 |
| WO | WO99/23370 A1 | 5/1999 |

OTHER PUBLICATIONS

Extended European Search Report maild Jan. 21, 2010.
Chinese Office Action dated Jan. 19, 2011 with English translation.

* cited by examiner

*Primary Examiner* — Tom Duong
(74) *Attorney, Agent, or Firm* — IPUSA, PLLC

(57) ABSTRACT

A mat product, includes a mat member including inorganic fibers and having a full length Lm; and a package member having an full length Lr; wherein the mat member is received in an inside space of the package member; the inside space of the package member is in gas-communication with an outside environment; and the full length Lr of the package member is greater than the full length Lm of the mat member and thereby the mat member can move in the inside space along a full length direction.

22 Claims, 13 Drawing Sheets

FIG.15
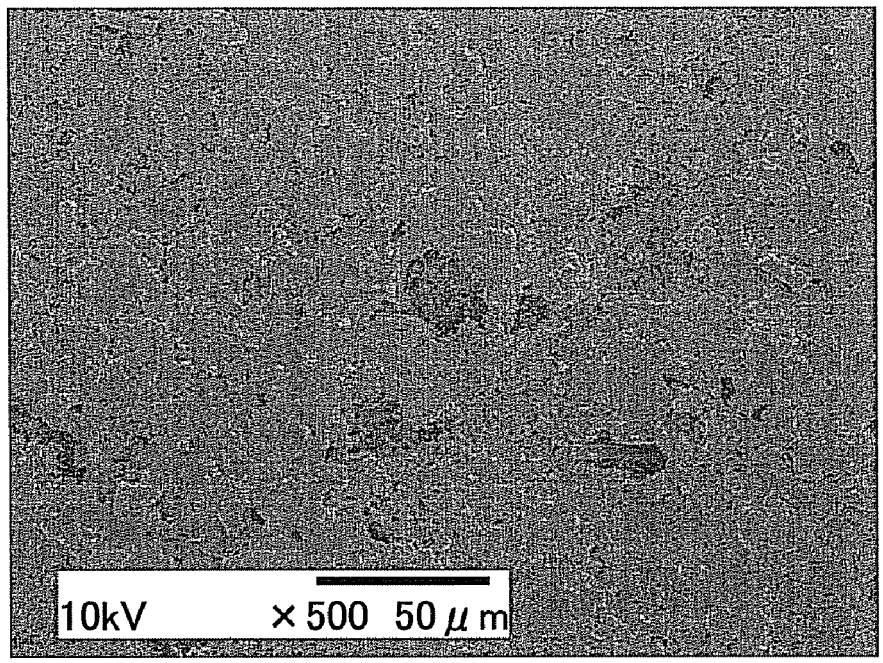
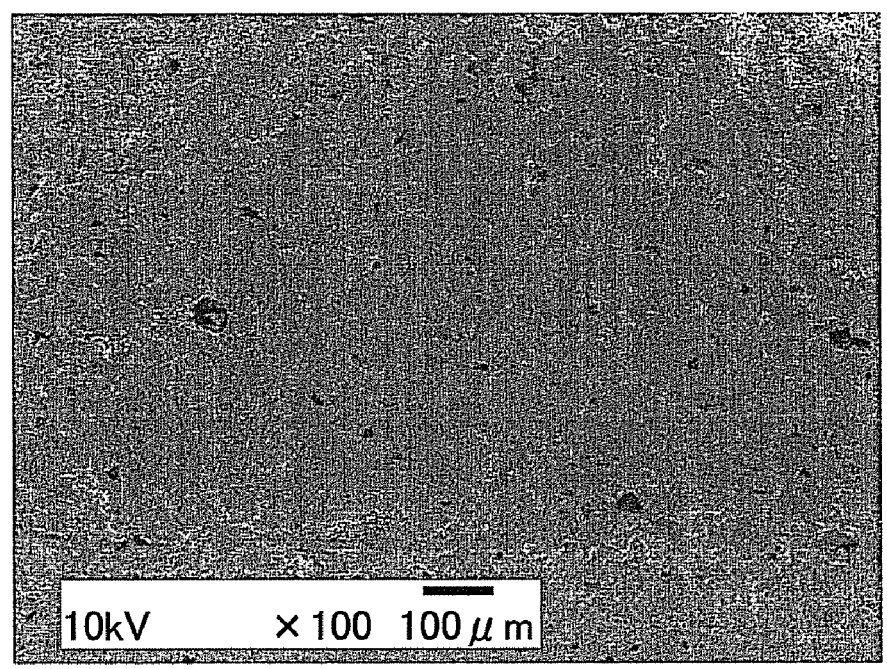

MAT PRODUCT, MANUFACTURING METHOD OF THE MAT PRODUCT, EXHAUST GAS TREATING APPARATUS, AND MUFFLER APPARATUS

CROSS-REFERENCE TO RELATED APPLICATIONS

This patent application is based upon and claims the benefit of priority of Japanese Patent Application No. 2008-246738 filed on Sep. 25, 2008 and Japanese Patent Application No. 2009-113805 filed on May 8, 2009 the entire contents of which are incorporated herein by reference.

BACKGROUND OF THE INVENTION

1. Field of the Invention

The present invention generally relates to mat members including inorganic fibers. More specifically, the present invention relates to a mat member used for an exhaust gas treating apparatus and a muffler apparatus of an automobile or the like.

2. Description of the Related Art

The number of automobiles is drastically increasing in this century. In proportion to the increase of the automobiles, the amount of exhaust gas discharged from internal combustion engines of the automobiles is drastically increasing. Particularly, various materials contained in exhaust gas of diesel engines may cause air pollution. Accordingly, this seriously influences the worldwide environment.

Under such a circumstance, various exhaust gas treating apparatuses have been suggested and utilized. In a normal exhaust gas treating apparatus, a cylinder-shaped member (casing) is provided at an exhaust pipe connected to a gas manifold of an engine. An exhaust gas treating part is provided in the cylinder-shaped member (casing). The exhaust gas treating part has opening parts for entry and exit of the exhaust gas. A large number of minute pores are provided inside the exhaust gas treating part. A catalyst carrier or an exhaust gas filter such as a diesel particulate filter (DPF) is used as an example of the exhaust gas treating part. In a case of, for example, the DPF, as the exhaust gas passes from the entry opening of the exhaust gas treating part to the exit opening of the exhaust gas treating part in order to be discharged, particles are trapped on walls of the peripheries of the pores in order to be eliminated from the exhaust gas.

It is normal practice to provide a holding seal member between the above-mentioned exhaust gas treating part and the casing. The holding seal member is configured to prevent breakage caused by contact of the exhaust gas treating part and the casing during driving of the automobile. In addition, the holding seal member is used for preventing the exhaust gas from leaking from a gap between the exhaust gas treating part and the casing. Furthermore, the holding seal member is configured to prevent the exhaust gas treating part from dropping off due to exhaust gas pressure. In addition, it is required to hold the temperature of the exhaust gas treating part high in order to maintain reactivity. Furthermore, a thermal insulation property is required for the holding seal member. A mat member including inorganic fibers such as an alumina group fiber can be used as a member satisfying these conditions.

The mat member is wound around (with respect to) at least a part of the external circumferential surface except the openings of the exhaust gas treating part. The mat member, fixed to the exhaust gas treating part in a body by taping or the like, functions as the holding seal member. After that, this united body is press fitted inside the casing so that the exhaust gas treating apparatus is formed.

SUMMARY OF THE INVENTION

Accordingly, embodiments of the present invention may provide a novel and useful mat product, a manufacturing method of the mat product, an exhaust gas treating apparatus, and a muffler apparatus solving one or more of the problems discussed above.

Another aspect of embodiments of the present invention may be to provide a mat product, including:

a mat member including inorganic fibers and having a full length Lm; and a package member having a full length Lr;

wherein the mat member is received in an inside space of the package member;

the inside space of the package member is in gas-communication with an outside environment; and the full length Lr of the package member is greater than the full length Lm of the mat member and thereby the mat member can move in the inside space along a full length direction.

Another aspect of the embodiments of the present invention may be to provide a manufacturing method of a mat product having a mat member including inorganic fibers, the method including the steps of:

preparing the mat member including the inorganic fibers and having a full length Lm; and receiving the mat member into an inside space of a package member, the package member having a full length Lr;

wherein the inside space of the package member is in gas-communication with an outside environment; and the full length Lr of the package member is greater than the full length Lm of the mat member and thereby the mat member can move in the inside space along a full length direction.

Another aspect of the embodiments of the present invention may be to provide an exhaust gas treating apparatus, including:

an exhaust gas treating part having two opening surfaces via which exhaust gas is communicated;

a holding seal member wound with respect to at least a part of an external circumferential surface of the exhaust gas treating part except the opening surfaces; and a cylindrical-shaped member configured to receive the exhaust gas treating part where the holding seal member is wound, wherein the holding seal member includes the above-mentioned mat product.

Another aspect of the embodiments of the present invention may be to provide a muffler apparatus, including:

an inner pipe;

an outer shell configured to cover an outside of the inner pipe; and an acoustical material provided between the inner pipe and the outer shell, wherein the acoustical material includes the above-mentioned mat product.

Other aspect of the present invention may be to provide an exhaust gas treating apparatus, including:

an exhaust gas treating part having two opening surfaces via which exhaust gas is communicated;

a holding seal member wound with respect to at least a part of an external circumferential surface of the exhaust gas treating part except the opening surfaces; and a cylindrical-shaped member configured to receive the exhaust gas treating part where the holding seal member is wound;

wherein the holding seal member includes a mat member including inorganic fibers;

the mat member is received in an inside space of a package member, the package member having a full length Lr;

the inside space of the package member is in gas-communication with an outside environment;

the full length Lr of the package member is greater than the full length Lm of the mat member and thereby the mat member can move in the inside space along a full length direction;

the mat member includes a first surface and a second surface situated at a side opposite to the first surface;

the package member includes a first side facing the first surface and a second side facing the second surface;

an outside surface of the first side of the package member has a coefficient of friction greater than a coefficient of friction of an outside surface of the second side of the package member; and the holding seal member is wound with respect to the exhaust gas treating part so that the outside surface of the first side of the package member is situated at a side of the exhaust gas treating part.

Another aspect of the embodiments of the present invention may be to provide a muffler apparatus, including:

an inner pipe;

an outer shell configured to cover an outside of the inner pipe; and an acoustical material provided between the inner pipe and the outer shell, wherein the acoustical material includes a mat member including inorganic fibers;

the mat member is received in an inside space of a package member, the package member having a full length Lr;

the inside space of the package member is in gas-communication with an outside environment;

the full length Lr of the package member is longer than the full length Lm of the mat member and thereby the mat member can move in the inside space along a full length direction;

the mat member includes a first surface and a second surface situated at a side opposite to the first surface;

the package member includes a first side facing the first surface and a second side facing the second surface;

an outside surface of the first side of the package member has a coefficient of friction greater than a coefficient of friction of an outside surface of the second side of the package member; and the acoustical material is wound with respect to the inner pipe so that the outside surface of the first side of the package member is situated at a side of the inner pipe.

Additional objects and advantages of the embodiments are set forth in part in the description which follows, and in part will become obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 15 is an electron microscope photograph of an external circumferential surface of the exhaust gas treating part.

DETAILED DESCRIPTION OF THE PREFERRED EMBODIMENTS

A description is given below, with reference to the FIG. 1 through FIG. 15 of embodiments of the present invention.

Figure 1:
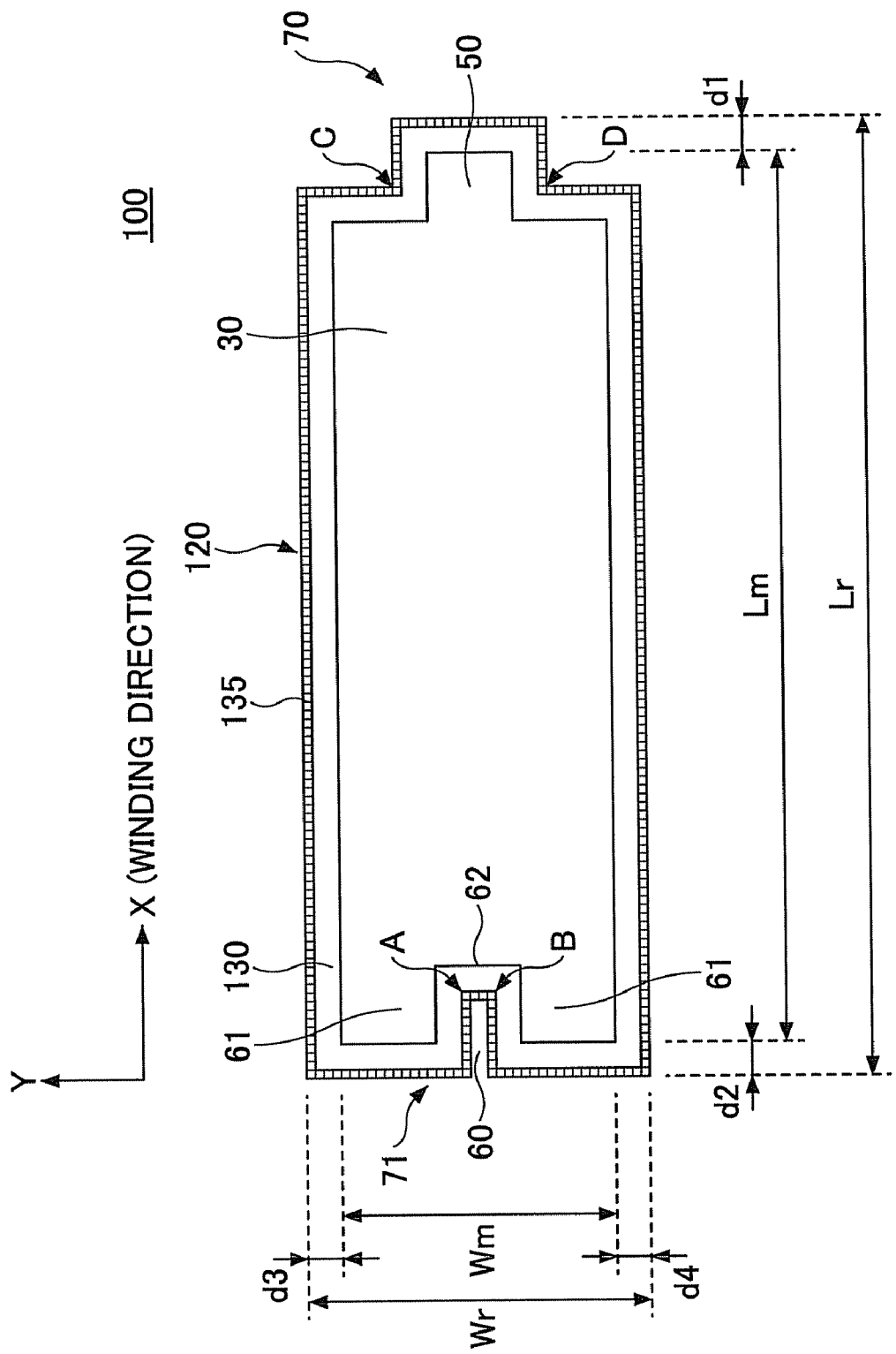
FIG. 1 is a schematic plan view of an example of a mat product of an embodiment of the present invention.

FIG. 1 is a schematic plan view of an example of a mat product of an embodiment of the present invention.

As shown in FIG. 1, a mat product 100 of the embodiment of the present invention includes a mat member 30 and a package member 120.

The mat member 30 has a whole length Lm (in an X-direction) and a width direction Wm (in a Y-direction). The mat member 30 is formed so as to have a substantially rectangular-shaped configuration. An engaging convex part 50 is provided at a short side 70 of the mat member 30. An engaging concave part 62 is provided at a short side 71 of the mat member 30. In addition, two convex parts 61 are formed in positions neighboring the engaging concave part 62 of the short side 71 of the mat member 30. It should be noted that, in the present invention, the configurations of the short sides 70 and 71 of the mat member 30 are not limited to those shown in FIG. 1. As the short sides 70 and 71 of the mat member 30, a side not having the engaging parts shown in FIG. 1, a side having plural of the engaging convex parts 50 or the engaging concave parts 62, or the like can be used. In the present application, "substantially rectangular-shaped configuration" includes a rectangle, as shown in FIG. 1, where two or more of the engaging convex parts 50 or the engaging concave parts 62 are provided at the short side of the mat member 30. In addition, "substantially rectangular-shaped configuration" includes a configuration where a corner part of the mat member 30 has an angle equal to or greater than 90 degrees such as a curvature.

As shown in FIG. 1, in the embodiment of the present invention, the entirety of the mat member 30 is covered with the package member 120. In other words, the mat member 30 is received in an inside space of the package member 120. Air is provided at a part of the inside space 130 other than a part that the mat member 30 occupies. The full length of the package member 120 is Lr and the width of the package member 120 is Wr.

The arrangement relationship between the mat member 30 and the package member 120 is obtained by, for example, the following method. That is, after one or more pieces of the sheet state package member 120 are arranged so as to cover the entire mat member 30, as shown in FIG. 1, end parts of the package member 120 are connected to each other so that a connecting part 135 is formed along and with a larger configuration than the circumference of the mat member 30. Alternatively, the mat member 30 may be provided in the package member 120 having an entrance and an inside space and then the entrance may be sealed, so that the entire mat member 30 may be covered with the package member 120. It is clear for one skilled in the art that the entire mat member may be covered with the package member 120, such as the mat product 100 shown in FIG. 1, by various methods.

The mat product 100 of the embodiment of the present invention has at least the following two specific features.

(i) The package member 120 has air permeability.

In other words, the inside space 130 of the package member 120 is in gas-communication with the outside environment. Although there is no limitation of a method for gas-communication between the inside space 130 and the outside environment, one or more minute openings are provided in each of the positions indicated by arrows A through D of the connecting part 135 in the example shown in FIG. 1. Because of this, there is gas-communication between the inside space 130 and the outside environment. There is no limitation of the configuration of the opening parts. The opening part may have, for example, a substantially circular-shaped, elliptic-shaped, or a slit-shaped (line-shaped) configuration. In a case where the opening part has the circular-shaped or the elliptic-shaped configuration, the diameter of the opening part (a maximum diameter in the case of the elliptic-shaped configuration) may be in a range between approximately 0.1 mm through 10 mm. In a case where the opening part has the slit-shaped configuration, the length of the opening part may be in a range between approximately 0.1 mm through 10 mm.

(ii) The full length Lr (length in the X direction) of the package member 120 is greater than the full length Lm of the mat member 30.

The position of the mat member 30 is not fixed in the inside space 130 of the package member 120. Accordingly, the mat member 30 can flexibly move a certain distance at least in the X direction in the inside space 130. This means that the mat member 30 and the package member 120 can move relative to each other in the X direction.

For example, as shown in FIG. 1, a space d1 is provided between an outline of the engaging convex part 50 of the mat member 30 and the connecting part 135 of the package member 120. A space d2 is provided between an outline of the convex parts 61 of the mat member 30 and the connecting part 135 of the package member 120. In other words, the full length Lr of the package member 120 is expressed as follows.

$Lr=Lm$(the full length of the mat member 30)$+d1+d2$

Accordingly, the mat member 30 can move in the X direction in the inside space 130 a distance "d1+d2" at most.

Figure 2:
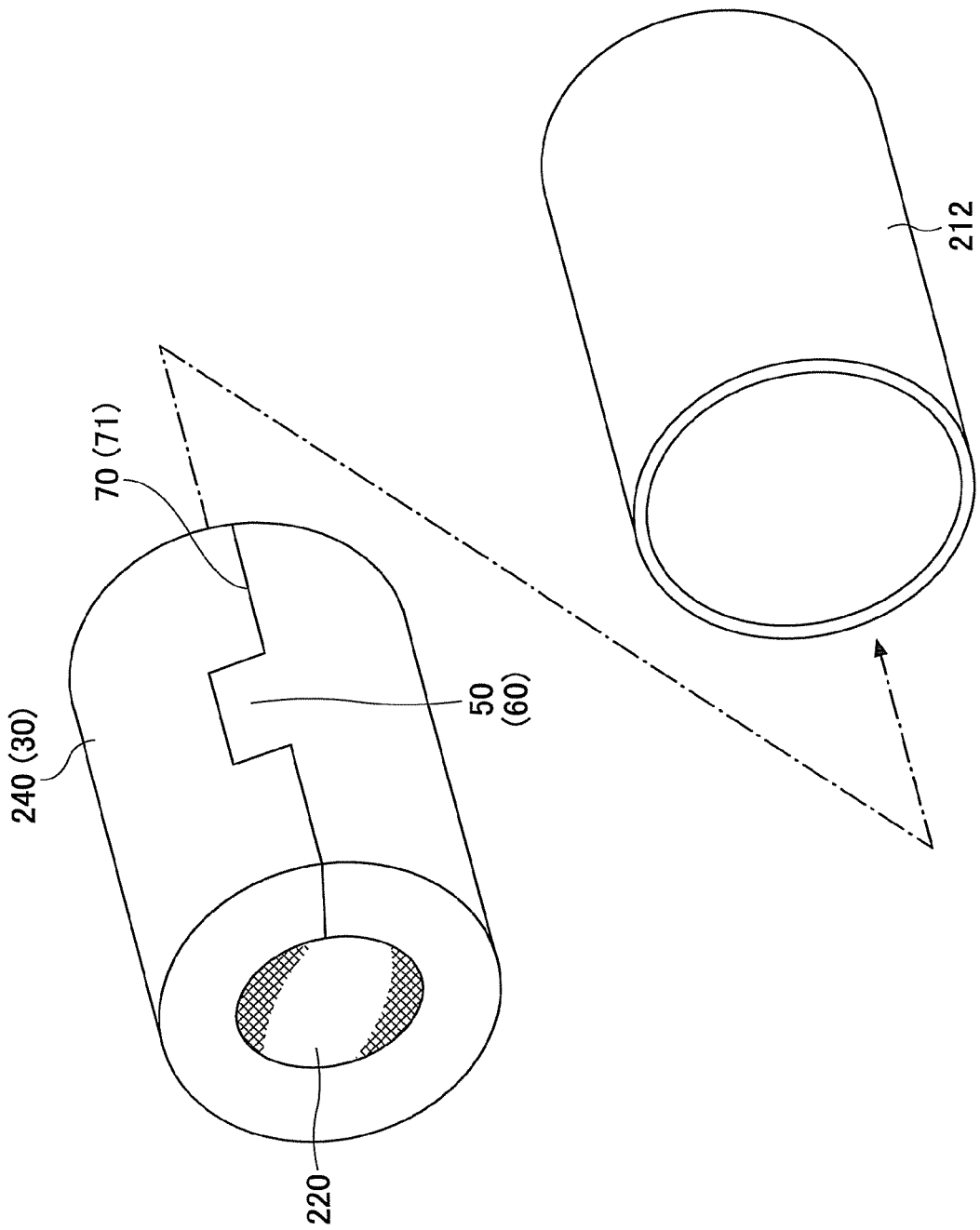
FIG. 2 is a perspective view of an exhaust gas treating apparatus where the mat product of the embodiment of the present invention is used as a holding seal member.

Next, an effect of the mat product 100 of the embodiment of the present invention having the above-discussed structure is discussed. FIG. 2 is an exploded structural view of an exhaust gas treating apparatus where the mat product of the embodiment of the present invention is used as a holding seal member.

As shown in FIG. 2, in a case where the mat product 100 of the embodiment of the present invention is used as a holding seal member 240 of the exhaust gas treating apparatus, a direction of a long side of the mat product 100 is a winding direction (X direction in FIG. 1). In addition, when the mat product 100 is wound, as the holding seal member 240, with respect to the exhaust gas treating part 220 such as a catalyst carrier, as shown in FIG. 2, the engaging convex part 50 and the engaging concave part 60 of the mat member 30 are engaged with each other so that the mat product 100 is fixed to the exhaust gas treating part 220. After that, the exhaust gas treating part 220 where the holding seal member 240 is wound is press fit and attached in a cylindrical-shaped casing 212 made of metal or the like. It should be noted that illustration of the package member 120 packaging the mat member 30 is omitted in FIG. 2.

Here, a conventional mat member includes a large amount of irritant and minute inorganic fibers (inorganic fibers having a diameter of, for example, approximately 3 µm through approximately 8 µm). Accordingly, for example, the inorganic fibers may be scattered from the mat member to the periphery during the handling of the mat member by an operator, so that the operations atmosphere may be degraded. Because of this, in order to prevent the problem of scattering of the inorganic fiber at the time of handling, it is normal practice that a needling treatment is applied to the mat member and then an impregnating (saturating) treatment using an organic binder is applied.

However, even in the mat member where a combination of the needling treatment and the impregnating (saturating) treatment using the organic binder is applied, as long as the mat member is exposed to the outside atmosphere, at the time of handling of the mat member, it is not possible to avoid a situation where a certain amount of the minute inorganic fibers is scattered from the mat member. Furthermore, in a case where the mat member with organic binder impregnated (saturated) is used as the holding seal member of the exhaust gas treating apparatus, the following problem may arise. That is, when the exhaust gas treating apparatus is actually used, especially at the time of initial use, organic components included in the mat member are cracked due to heat of the exhaust gas so as to be discharged outside the apparatus. In recent years, restricting the organic components in the exhaust gas has becomes more and more strict. Hence, it is desirable to prevent the discharge of such organic components as much as possible.

On the other hand, in the mat product 100 of the embodiment of the present invention, as discussed above, the entire mat member 30 is covered with the package member 120. In addition, since the opening parts for gas-communication between the outside environment and the inside space 130 have minute dimensions, scattering of the inorganic fibers can be mostly disregarded. Therefore, the mat member 30 is substantially isolated from the outside environment so that it is possible to effectively prevent scattering of the inorganic fibers from the mat member 30 to the outside.

The embodiment of the present invention has at least the above-discussed two specific features (i) and (ii).

By the specific feature (i) where the inside space 130 of the package member 120 is in gas-communication with the outside environment, the following effect can be obtained. As discussed above, in a case where the mat product 100 is used as the holding seal member 240 of the exhaust gas treating apparatus, the mat product 100 is wound with respect to the exhaust gas treating part 220. In a case where the inside space 130 of the package member 120 is sealed, at the time of the winding operation of the mat product 100, an inside pressure of the inside space 130 of the package member 120 is increased so that the package member 120 may be broken or damaged. In general, at the time of breakage of the package member 120, a large pressure generated in the inside space is released to cause flow to the outside environment. As a result of this, the minute inorganic fibers are exposed to the outside atmosphere. Furthermore, once the package member is broken, the minute inorganic fibers may be scattered from the brakeage part. On the other hand, in the case of the embodiment of the present invention having the specific feature (i), it is possible to effectively prevent an increase of the inside pressure of the inside space 130 of the package member 120 at the time of the winding operations of the mat product 100. Accordingly, in the mat product 100, by the specific feature (i) of the embodiment of the present invention, it is possible to effectively prevent breakage of the package member 120 and scattering of the inorganic fibers.

Figure 3:
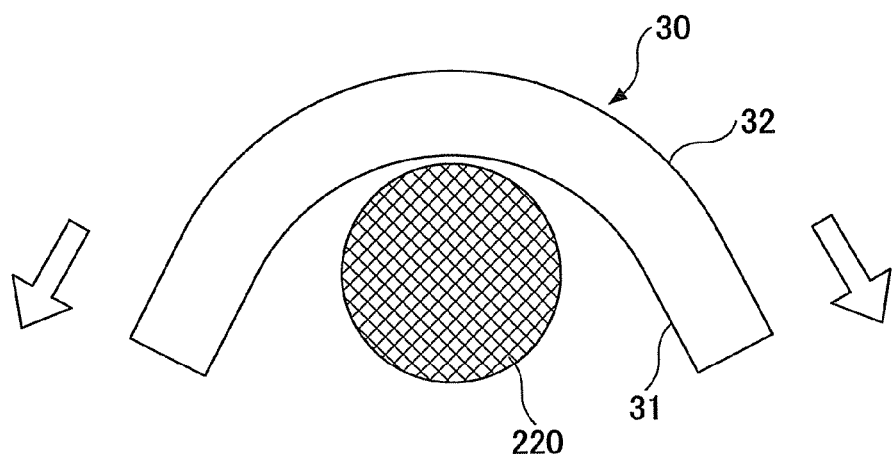
FIG. 3 is a view schematically showing where a mat member is wound with respect to an exhaust gas treating member.

In addition, by the specific feature (ii) where the mat member 30 and the package member 120 can mutually move in at least the winding direction (X direction), the following effect can be achieved. When the mat product 100 is wound with respect to the exhaust gas treating part 220, as shown in FIG. 3, the extending amount of the mat member 30 is changed, due to the difference of the circumferential lengths, at a first surface side 31 (coming in contact with the exhaust gas treating part 220) and a second surface side 32 (coming in contact with the casing 212) of the mat member 30. Accompanying this, even in the package member 120, the extending amounts are different from each other between a side facing the first surface side 31 and a side facing the second surface side 32 of the mat member 30. However, normally, a limiting value of the extending amount of the package member 120 is smaller than that of the mat member 30 having a certain degree of a bulk height. Accordingly, in a case where the lengths of the package member 120 and the mat member 30 in the winding direction (X direction in FIG. 1), that is the full lengths of the package member 120 and the mat member 30 are substantially equal to each other, or in a case where the mat member 30 is stuck and fixed to the inside surface of the package member 120 so that the position of the mat member 30 is fixed to the inside surface, at the time of the winding operations of the mat product 100, the package member 120 does not follow the extension of the mat member 30 so as to possibly be broken. If such a breakage happens in the package member 120, the minute inorganic fibers may scatter from the breakage part of the package member 120.

On the other hand, in the case of the embodiment of the present invention having the above-discussed specific feature (ii), the package member 120 can move along the winding direction (X direction) relative to the mat member 30. Therefore, it is possible to effectively prevent the generation of the problem where at the time of the winding operations of the mat product 100, the package member 120 does not follow the extension of the mat member 30 so as to possibly be broken. Accordingly, in the mat product 100 of the embodiment of the present invention, by the specific feature (ii), it is possible to effectively prevent breakage of the package member 120 and scattering of the inorganic fibers.

Thus, in the mat product 100 of the embodiment of the present invention, at the time of the handling operations, it is possible to effectively prevent breakage of the package member 120 and scattering of the inorganic fibers.

Furthermore, in the mat product 100 of the embodiment of the present invention, even if the package member 120 is made of an organic material, as long as the package member 120 is not made drastically thick (for example, equal to or greater than several mm), the discharge amount of the organic compounds by the package member 120 is effectively smaller than the discharge amount of the organic compounds of the related art mat member where the inorganic binder is impregnated (saturated). For example, as discussed below, in a case of the package member 120 having dimensions greater than the mat member 30 and being made of high density polyethylene having thickness of 10 μm, the discharged amount of the inorganic components is equal to or less than approximately 1/3 and equal to or greater than 1/6 of the related art mat member (expected containing amount 5 wt % through 10 wt %) including the inorganic binder.

Thus, according to the embodiment of the present invention, it is possible to provide a mat product whereby, compared to a conventional mat member, scattering of inorganic fibers may not be generated and the amount of organic components discharged from an exhaust gas treating apparatus where the mat member is applied can be made small.

Thus, the mat member 30 included in the mat product 100 of the embodiment of the present invention may be made by any method, may have any configuration, dimensions, and structure, and may be made of any materials, as long as the mat member 30 includes inorganic fibers.

Furthermore, the package member 120 may have any configuration, dimensions, and structure, and may be made of any materials, as long as the package member 120 has the above-discussed specific features (i) and (ii).

The package member 120 (and/or the inside space 130) may have, as seen in a direction in parallel with a thickness direction of the mat member 30, various configurations such as a substantially rectangular-shaped, square-shaped, circular-shaped, or elliptic-shaped configuration. In addition, for example, the package member 120 (and/or the inside space) may have the same configuration as that of the mat member 30 (but have different dimensions from that of the mat member 30). For example, the package member 120 (and/or the inside space) may have, as shown in FIG. 1, a substantially rectangular-shaped configuration where a concave part and a convex part are respectively provided at sides facing each other.

In a case where the package member 120 has a substantially rectangular-shaped configuration, there is no limitation of the dimensions of the width Wr of the package member 120 as long as the width Wr of the package member 120 is equal to or greater than the width Wm of the mat member 30. For example, as shown in FIG. 1, the width Wr of the package member 120 may be equal to a sum of the width Wm of the mat member 30, d3 (which is a distance from an end part of a long side in the X direction of the mat member 30 to the package member 120) and d4 (which is a distance from an end part of another long side in the X direction of the mat member 30 to the package member 120).

Alternatively, a ratio of the width Wr of the package member 120 relative to the width Wm of the mat member 30, namely Wr/Wm, may be equivalent to a ratio of the full length Lr of the package member 120 relative to the full length Lm of the mat member 30, namely Lr/Lm. In this case, the package member 120 (and/or the inside space 130) may have, seen in a direction parallel to a thickness direction of the mat member 30, a substantially analogous configuration of the mat member 30 and dimensions larger than those of the mat member 30. It is preferable that the ratio Lr/Lm be in a range between 1.1 through 1.3. If the ratio Lr/Lm is less than 1.1, the effect of the above-mentioned specific feature (i) of the embodiment of the present invention is relatively weak. If the ratio Lr/Lm is greater than 1.3, the amount of the organic components discharged to the outside at the time when the exhaust gas treating apparatus having such a mat member is used may be increased. The ratio Wr/Wm is, for example, in a range between approximately 1.0 through 1.3. For example, the ratio Wr/Wm is 1.2.

In addition, the package member 120 may be made of, for example, an organic material, a metal material or inorganic material. In the case where the package member 120 is made of the organic material, PET (polyethylene terephthalate), polypropylene, polyethylene, nylon, pulp, or the like may be used as the organic material. In the case where the package member 120 is made of the metal material, an aluminum foil, a stainless foil, or the like may be used as the metal material. In the case where the package member 120 is made of the inorganic material, an oxide film, incombustible material or the like may be used as the inorganic material.

There is no limitation of a state (form) of the material forming the package member 120. The material forming the package member 120 may be, for example, a sheet, a film, or a thin film. Alternatively, the material forming the package member 120 may have synthetic fibers such as a nonwoven fabric arranged in a nonwoven fabric process. The package member 120 may be a net whose mesh is sufficiently minute.

The package member 120 may be made of a material having extension anisotropy in-plane. For example, where a material whose extension in the full length direction (X direction in FIG. 1) is greater than that of the width direction (Y direction in FIG. 1) is used for the package member 120, it is possible to provide the holding seal member 240 which may easily extend in the winding direction and may not easily extend in the press fit direction. In this case, it is possible to easily perform the operation for winding the holding seal member 240 with respect to the exhaust gas treating part 220 and to easily press fit the holding seal member 240 to the casing 212.

It is not always necessary to form the entire package member 120 with a single material. Depending on a portion of the package member 120, different materials may be used.

For example, materials having different coefficients of friction may be used at a first part facing the first surface side 31 (an internal side when wound with respect to the exhaust gas treating part 220) of the mat member 30 of the package member 120 and the second part facing a second surface side 32 (an external side when wound with respect to the exhaust gas treating part 220) of the mat member 30 of the package member 120.

For example, a material having a high coefficient of friction may be used for the first part so that a holding force relative to the exhaust gas treating part 220 is heightened. A material having a low coefficient of friction may be used for the second part so that sliding relative to an inside surface of the casing 212 is made easy. In this case, it is possible to obtain the holding seal member 240 having a good holding force relative to the exhaust gas treating part 220 and to easily press fit the holding seal member 240 to the casing 212. Accordingly, it is possible to easily manufacture the exhaust gas treating apparatus having a good holding force relative to the exhaust gas treating part 220.

As a combination of materials so that the coefficients of friction are different between the first part and the second part of the package member 120, for example, a combination of low-density polyethylene (LDPE) and high-density polyethylene (HDPE) is used.

Normally, the coefficient of friction of a surface of HDPE is lower than that of the LDPE. Accordingly, by applying LDPE to the first part of the package member 120 and applying HDPE to the second part of the package member 120, it is possible to achieve the above-mentioned effects (the mat product 100 whereby the good holding force can be achieved relative to the exhaust gas treating part 220 and press fitting to the casing 212 can be easily made).

Alternatively, for example, LDPE or HDPE may be used for the first part of the package member 120 and PET having a coefficient of friction lower than that of LDPE or HDPE may be used for the second part of the package member 120.

As another combination of materials so that the coefficients of friction are different between the first part and the second part of the package member 120, for example, a combination of the above-mentioned organic material (for example, polyethylene) and nonwoven fabric is used. The nonwoven fabric, compared to the above-mentioned organic material, normally has a large number of minute convexoconcaves (one example of "minute concave and convex" is discussed below) and therefore the coefficient of friction of the nonwoven fabric is relatively large. Accordingly, by applying the nonwoven fabric to the first part of the package member 120, it is possible to achieve the above-discussed effect. The nonwoven fabric includes, for example, organic fibers, a subject manufactured by a spin-bonding method, a subject manufactured by a dry method, and a subject (including papers) manufactured by a wet method.

The package member 120 where the coefficients of friction are different between the first part and the second part of the package member 120 can be obtained by changing the materials of the first part and the second part or the way of manufacturing the package member 120. For example, in a case where an embossing process, a corona process, or a waveform process is applied to the second part so that the surface of the package member 120 is formed, the coefficient of friction of such a surface is decreased. Accordingly, by control of the form (shape) of the package member 120, the friction at the interface of the package member 120 and the casing 212 becomes small so that it is possible to easily perform press fitting of the exhaust gas treating part 220 where the mat product 100 is wound into the casing 212.

Alternatively, by forming a micro convexoconcave at the first part of the package member 120, the coefficient of friction of the first part, compared to the second part of the package member 120, can be heightened.

Here, the micro convexoconcave means a minute convexoconcave where the difference of heights of highest and lowest points of the convexoconcave (hereinafter "convexoconcave difference") is equal to or less than approximately 500 μm, for example equal to or less than approximately 200 μm. Accordingly, this micro convexoconcave is a minute convexoconcave different from a macro convexoconcave formed on the surface by the embossing process, the corona process, or the waveform process.

It is a normal practice that the macro convexoconcave can achieve an effect where a contact area between this surface and a contact member coming in contact with the surface is reduced so that the friction of the contact member is decreased. Accordingly, in the case of the macro convexoconcave, the convexoconcave difference is equal to or greater than approximately 1 mm. On the other hand, in the case of the micro convexoconcave of the surface, the micro convexoconcave and a convexoconcave formed on a surface of the contact member coming in contact with the surface are mutually acted on (for example, mutually connected to each other), so that the coefficient of friction of the contact member is heightened. For example, in a micro level, a large number of convexoconcaves are formed on an exposed surface of the exhaust gas treating part 220. Because of this, in a case where the surface of the package member 120 having the micro convexoconcave comes in contact with the exhaust gas treating part 220, due to the mutual action of the convexoconcave surfaces, friction resistance of the interface is increased.

By forming the micro convexoconcave on the first part of the package member 120, the friction resistance between the exhaust gas treating part 220 and the mat product 100 is increased. As a result of this, it is possible to provide a good holding force relative to the exhaust gas treating part 220 by the mat product 100.

Such a micro convexoconcave is not limited to the above-discussed example. For example, the micro convexoconcave may be formed by applying heat treatment or the like to the first part of the package member 120 so that surface is modified. For example, in a case where the heat treatment is properly applied to the package member 120 made of HDPE, it is a normal practice that a high friction surface having a micro convexoconcave whose convexoconcave difference is in a range between approximately 10 μm through 500 μm can be obtained.

It is clear for one skilled in the art that there is no limitation of positions, the number, configuration, dimensions, or the like of a part (for example, the opening part) configured to be in gas-communication with the inside space 130 of the package member 120 and the outside environment. For the purpose of prevention of scattering of minute inorganic fibers, it is preferable that the opening part provided at the package member 120 be provided at a portion other than the first part and the second part where the first side 31 and the second side 32 of the mat member 30 may always come in contact. In addition, it is preferable that the dimensions of the opening part be relatively small. For example, in a case where minute circular-shaped holes having diameters of approximately 0.1 mm through 5 mm are formed as the opening part at four portions A through D in FIG. 1, scattering of the inorganic fibers to the outside can be made small.

In the above-discussed explanation, the dimension Hr of the package member 120 in the thickness direction of the mat member 30 is not discussed. However, it is clear that there is no limitation of the dimension Hr as long as the dimension Hr is greater than the thickness of the mat member 30 and is not an unexpected dimension (such that the dimension Hr is greater than the width Wr). Actually, from the view point of handling, cost, or the like, the dimension Hr is approximately 1.05 through 3 times the thickness of the mat member 30.

Figure 4:
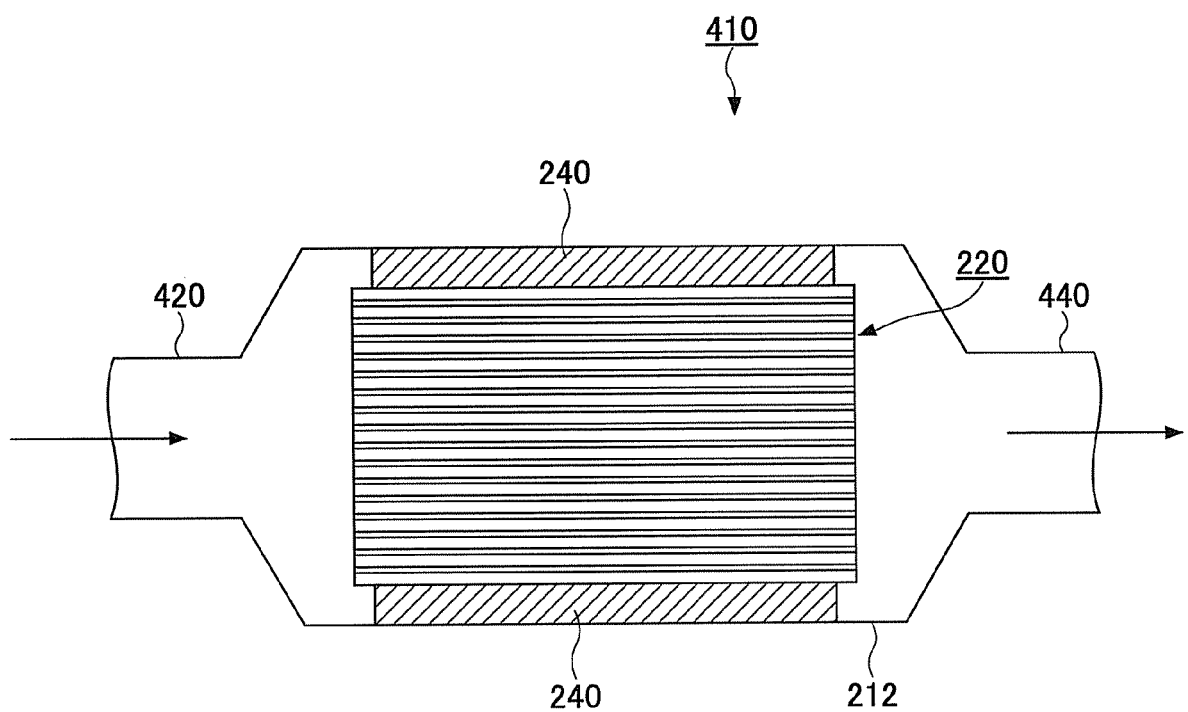
FIG. 4 is a view showing an example of the exhaust gas treating apparatus of the embodiment of the present invention.

The mat product 100 of the embodiment of the present invention can be used as a holding seal member 240 of the exhaust gas treating apparatus 410. FIG. 4 is a view showing an example of the exhaust gas treating apparatus 410 of the embodiment of the present invention.

The exhaust gas treating apparatus 410 includes the exhaust gas treating part 220, the casing 212, an entrance pipe 420, and an exit pipe 440. The holding seal member 240 is wound with respect to the external circumferential surface of the exhaust gas treating part 220. The casing 212 receives the exhaust gas treating part 220. The entrance pipe 420 for the exhaust gas is connected to an entrance side of the casing 212. The exit pipe 440 for the exhaust gas is connected to an exit side of the casing 212. In an example shown in FIG. 4, the entrance pipe 420 and the exit pipe 440 have taper-shaped configurations where diameters of the entrance pipe 420 and the exit pipe 440 expand in positions where the entrance pipe 420 and the exit pipe 440 are connected to the casing 212. Furthermore, in the example shown in FIG. 4, the exhaust gas treating part 220 is a catalyst carrier having opening surfaces for entry and exit of the exhaust gas and a large number of piercing holes in a direction parallel with a gas flow. The catalyst carrier is made of, for example, honeycomb-shaped pore silicon carbide or the like. However, the structure of the exhaust gas treating apparatus 410 of the embodiment of the present invention is not limited to the above-discussed structure. For example, a DPF where a part of the piercing holes are closed can be used as the exhaust gas treating part 220.

The holding seal member 240 includes the mat product 100 of the embodiment of the present invention where the mat member 30 is covered with the package member 120. When the holding seal member 240 is attached to the exhaust gas treating apparatus 410, scattering of the inorganic fibers is effectively prevented.

The exhaust gas treating apparatus 410 of the example of the present invention can achieve the effect where the amount of the organic components decomposed and discharged by heat from the exhaust gas at the time of use (especially at the time of initial use) can be effectively prevented.

Figure 5:
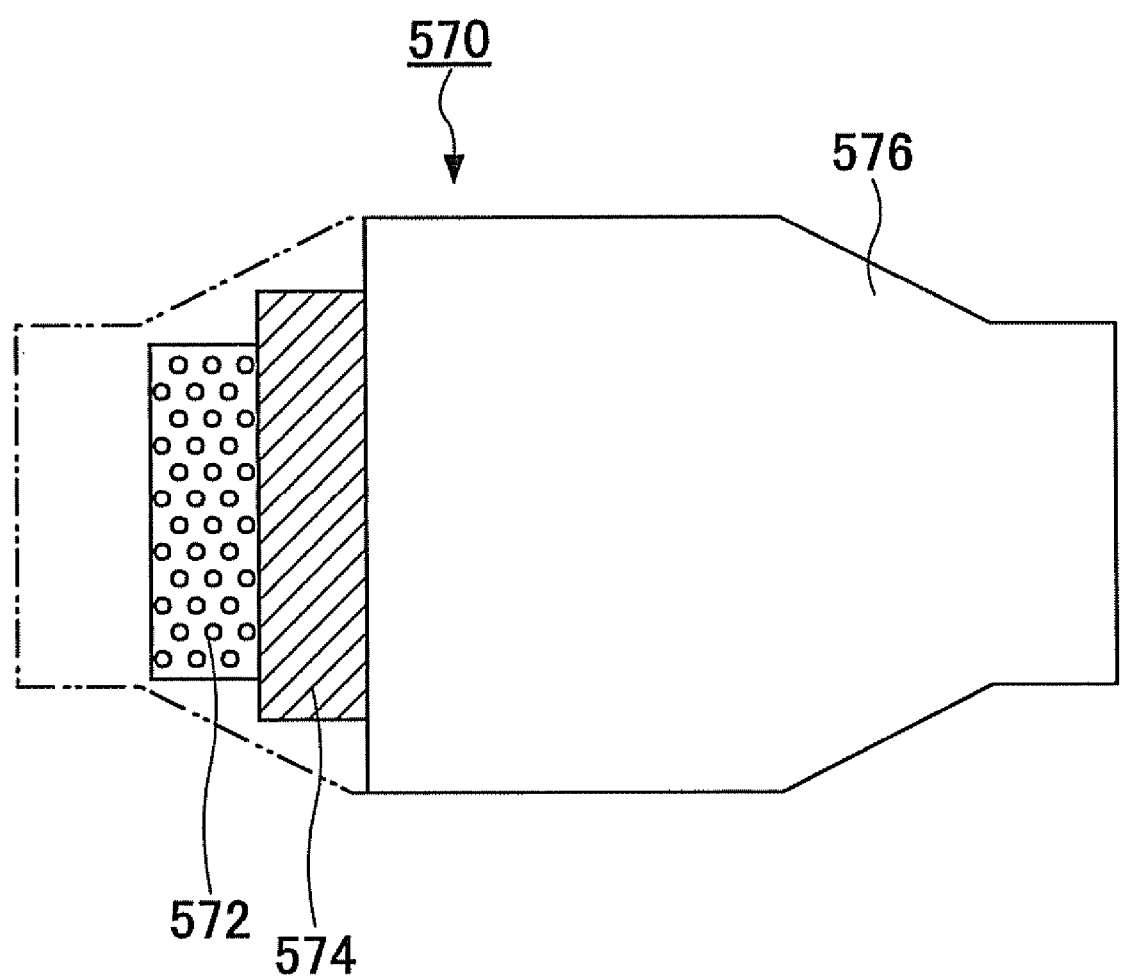
FIG. 5 is a view showing an example of a muffler apparatus of the embodiment of the present invention.

Next, an example where the mat product 100 of the embodiment of the present invention is applied is discussed. FIG. 5 is a view showing an example of a muffler apparatus of the embodiment of the present invention. The muffler apparatus is provided in the way of an exhaust pipe of the engine of an automobile or the like. A muffler apparatus 570 includes an inner pipe 572, an outer shell 576, and an acoustical material 574. The inner pipe 572 is made of, for example, metal such as stainless steel. The outer shell 576 is configured to cover an outside of the inner pipe 572. The outer shell 576 is made of, for example, metal such as stainless steel. The acoustical material 574 is provided between the inner pipe 572 and the outer shell 576. Normally, small holes are formed in a surface of the inner pipe 572. In such a muffler apparatus 570, when exhaust gas flows inside the inner pipe 572, noise elements included in the exhaust can be attenuated by the exhaust member 574.

The mat product 100 of the embodiment of the present invention can be used as the acoustical material 574. By using the mat product of the embodiment of the present invention as the acoustical material 574, scattering of the inorganic fibers which may happen at the time when the exhaust member 574 is provided in the muffler apparatus 570 can be prevented. In addition, the muffler apparatus 570 of the example of the present invention can achieve the effect where the amount of the organic components decomposed and discharged by heat from the exhaust gas at the time of use (especially at the time of initial use) can be effectively prevented.

(Manufacturing Method of the Mat Product of the Embodiment of the Present Invention)

Next, an example of a manufacturing method of the mat product 100 of the embodiment of the present invention is discussed. It is clear for one skilled in the art that the mat product 100 may be manufactured by a method other than the method discussed below.

Figure 6:
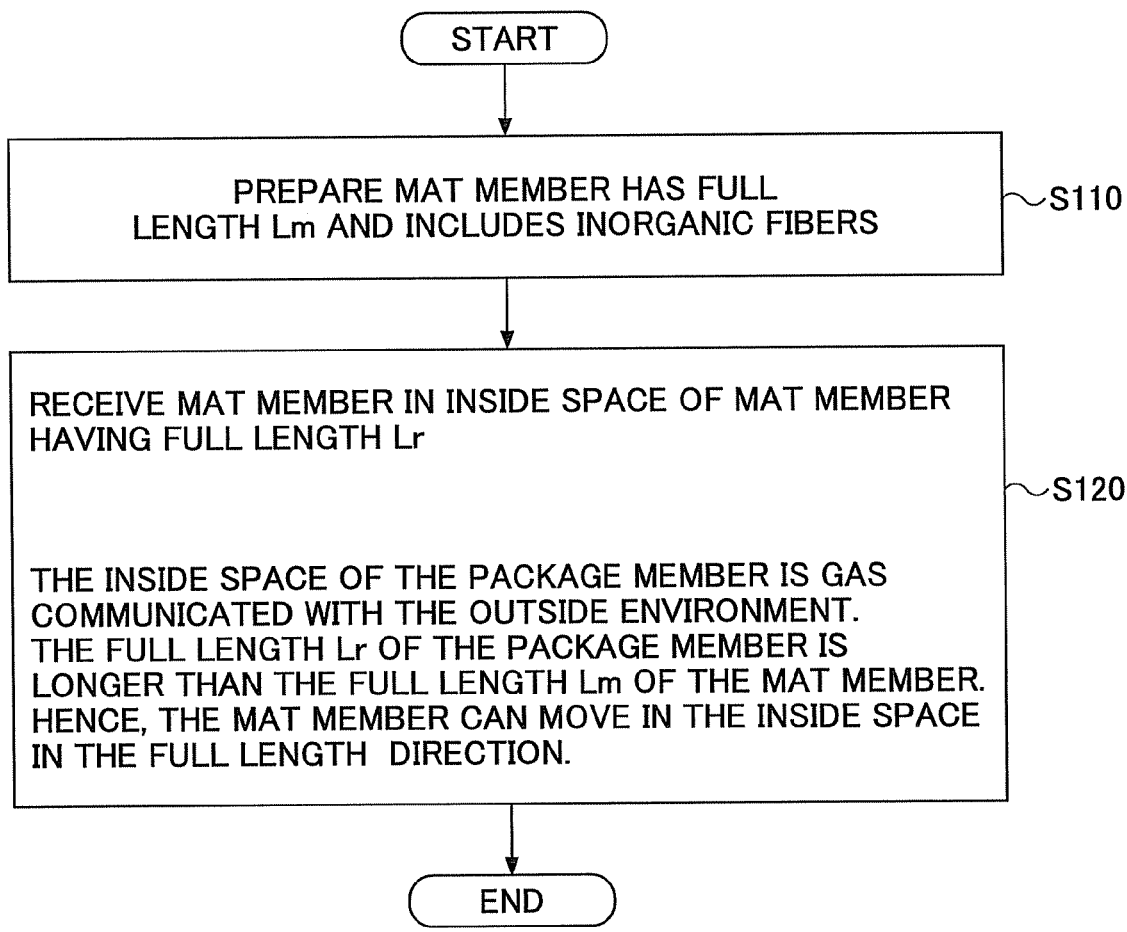
FIG. 6 is a flowchart of a manufacturing method of the mat product of the embodiment of the present invention.
Figure 7:
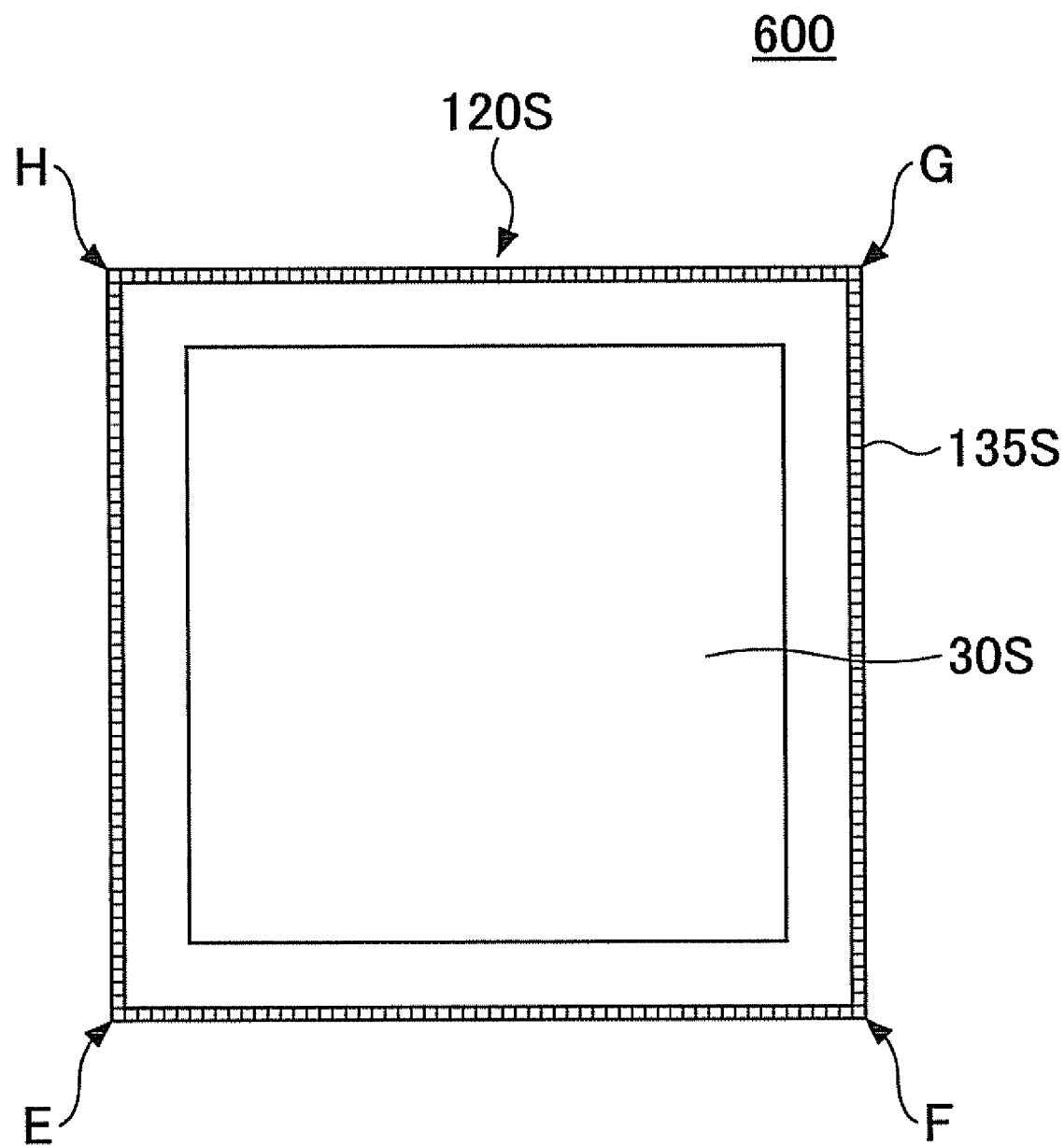
FIG. 7 is an upper view showing a sample of a example 1.

FIG. 6 is a flowchart of the manufacturing method of the mat product of the embodiment of the present invention. The manufacturing method of the mat product of the embodiment of the present invention includes a step of preparing the mat member including the inorganic fibers and having a full length Lm (S110), and receiving the mat member into an inside space of a package member, the package member having an full length Lr, wherein the inside space of the package member is in gas-communication with the outside environment, and the full length Lr of the package member is greater than the full length Lm of the mat member and thereby the mat member can move in the inside space along a full length direction (s120). Both steps are discussed below in detail.

(Step S110)

First, the mat member including the inorganic fibers is manufactured.

In the following, a method of manufacturing the mat member by using a needling treatment is discussed. It is clear for one skilled in the art that the mat member of the embodiment of the present invention may be manufactured by a method other than the method discussed below. Furthermore, although a mixture of alumina and silica is used as the inorganic fibers in the following method, a material of the inorganic fibers is not limited to this example. For example, the inorganic fibers may be made of only alumina or only silica.

A silica sol is applied to a basic aluminum chloride solution where an aluminum content is 70 g/l and an atomic ratio $A1$ relative to $C1$ is 1.8, so that, for example, a composition ratio of alumina-silica is approximately 60 through 80: approximately 40 through 20 and thereby a precursor of the inorganic fibers is made. It is preferable that the composition ratio of alumina-silica be approximately 70 through 74: approximately 30 through 26. If a composition ratio of alumina is equal to or less than approximately 60%, a composition ratio of mullite generated by alumina and silica is low, so that heat conductivity of the completed mat member may be high.

Next, an organic polymer such as polyvinyl alcohol is added to a precursor of alumina fibers. After that, this liquid is concentrated to make a spinning solution. Then, fiber spinning is performed with this spinning solution by using a blowing method.

The blowing method is a method for fiber spinning by using an air flow blowing out from an air nozzle and a spinning liquid flow being pushed out from a spinning liquid supply nozzle. The gas flow speed per slit from the air nozzle is normally approximately 40 m/s through approximately 200 m/s. The diameter of the spinning nozzle is normally approximately 0.1 mm through approximately 0.5 mm. A liquid amount per a single spinning liquid supply nozzle is normally approximately 1 ml/h through approximately 120 ml/h. It is preferable that the liquid amount per a single spinning liquid supply nozzle be approximately 3 ml/h through approximately 50 ml/h. Under these conditions, the spinning liquid being pushed out from the spinning liquid supply nozzle is sufficiently extended without being in a spray (mist) state and the fibers may not be adhered to each other. Hence, by making the spinning conditions proper, it is possible to obtain the alumina fiber precursor where fiber diameter distribution is narrow and even.

The precursors where spinning fibers are completed are stacked so that a stacked layers sheet is manufactured. Then, a needling treatment is applied to the stacked layers sheet. The needling treatment is a treatment where needles are entered to and removed from the staked layers sheet so that the sheet is made thin. Normally, a needling apparatus is used for the needling treatment.

Normally, the needling apparatus includes a needle board and a pair of supporting boards. The needle board can reciprocally move in a thrust direction (normally, upper and lower directions). Two supporting boards are provided one on each of a front surface and a rear surface of the stacked layers sheet. A large numbers of the needles configured to thrust the stacked layers sheet are provided at the needle board with densities of approximately 25 through approximately 5000/100 $cm^2$. In addition, a large number of piercing holes for needling are provided at each of the supporting boards. Accordingly, by approaching the needle board to or leaving the needle board from the stacked layers sheet where the stacked layers sheet is pushed from both surfaces by the supporting boards, the needles enter into and are removed from the stacked layers sheet so that a large number of confounding points where the fibers are confounded are formed.

As an alternative structure, the needling apparatus may have two pairs of needle boards. Each of the needle boards has a supporting board. Two pairs of the needles boards are provided one on the front surface and one on the rear surface. The stacked layers sheet is fixed from both surfaces by the corresponding supporting boards. On the other hand, the needles are provided at one of the needle boards so as to not be overlapped with a needle group of another needle board at the time of the needling treatment. Considering the needle arrangement of both needle boards, a large number of piercing holes are provided at each of the supporting boards so that the needles do not come in contact with the supporting boards at the time of the needling treatment from both surfaces sides of the stacked layers sheet. By using such an apparatus, the stacked layers sheet may be sandwiched from both surface sides by the two pairs of the supporting boards, and the needling treatment may be performed from both sides of the stacked layers sheet by the two pairs of the needling boards.

Next, the stacked layers sheet where the needling treatment is applied is heated from a normal temperature and firing is continuously performed at higher temperature approximately 1250° C. As a result of this, a mat member having a designated basing weight (weight per unit area) can be obtained.

It is normal practice that an organic binder which may be resin is impregnated (saturated) in the obtained mat member so that handling abilities of the mat member are improved. As the organic binder, epoxy resin, acrylic resin, rubber group resin, styrene resin, or the like can be used. For example, acrylic group (ACM) resin, acrylonitrile-butadiene rubber (NBR) resin, styrene butadiene rubber (SBR) resin, or the like can be used as the organic binder. The content of the organic binder (the weight of the organic binder relative to the gross weight of the organic binder) is, for example, in a range between approximately 1.0 weight % and approximately 10.0 weight %. The organic binder impregnated (saturated) in the mat member may cause an increase of the amount of organic components discharged from the exhaust gas treating apparatus when the exhaust gas treating apparatus having such a mat member is used. In the embodiment of the present invention, since the amount of the organic components discharged from the exhaust gas treating apparatus is small, it is preferable that the organic binder not be impregnated (saturated) in the mat member.

The mat member 30 manufactured by the above-mentioned method is cut so as to have a designated configuration such as a configuration shown in FIG. 1.

(Step S120)

Next, the mat member 30 having been cut is received in the package member 120. There is no limitation of a method of receiving the mat member in the package member. For example, the entire mat member may be covered with a single sheet member larger than the mat member and then the end parts of the sheet member may be connected to each other, and thereby the mat member may be received in the package member. Alternatively, the mat member may be arranged between two sheet members having dimensions greater than that of the mat member and the end parts of the sheet members may be connected to each other, and thereby the mat member may be received in the package member. The mat member may be received in the package member by using various methods other than the above-mentioned methods. It is necessary to form the mat product so that at least the above-discussed specific feature (ii) is obtained, when the mat member is received in the package member.

Next, the inside space 130 of the package member 120 where the mat member 30 is received is in gas communication with the outside environment. This may be performed by forming the opening parts in any position of the package member (or by forming the opening parts in advance). Alternatively, in the step of receiving the mat member in the package member, an incomplete part (that is, a part where the sheets are not completely closed) may be intentionally formed at the connecting part of the sheet member and the incomplete part may be used so that the inside space and the outside environment may be in gas communication with each other. It is clear for one skilled in the art that that the inside space and the outside environment may be put in gas communication with each other by using other methods.

In the case where the inside space and the outside environment are placed in gas communication with each other by forming the opening parts, it should be noted that the inorganic fibers should be prevented from being discharged to the outside via the formed opening parts. Because of this, it is preferable that the opening parts be formed in parts of the package member 120 which may not directly come in contact with the mat member 30, such as the connecting part 135 of the sheet members. For similar reasons, it is preferable that the dimensions (a diameter in a case where the opening part has a circular-shaped configuration) of the opening part be, for example, in a range between approximately 0.1 mm and approximately 5.0 mm such as between approximately 1 mm and approximately 2 mm.

Via these steps, the mat member 30 can be received in the inside space of the package member 120. A double-sided tape may be provided at a part of the external surface of the package member 120. For example, in a case where the double-sided tape is provided at a surface side coming in contact with the exhaust gas treating part 220 of the package member 30, when the mat product 100 of the embodiment of the present invention is wound with respect to and fixed to the exhaust gas treating part 220, the exhaust gas treating part 220 and the package member 30 are preliminarily fixed so that the winding operations of the mat product 100 can be easily performed.

EXAMPLE

The effects of the embodiment of the present invention are discussed below.

Example 1

First, a silica sol was applied to a basic aluminum chloride solution where an aluminum content is 70 g/l and the atomic ratio of Al relative to Cl is 1.8, so that, for example, a composition ratio of alumina-silica was 72:28 and thereby a precursor of the inorganic fibers was made. Next, polyvinyl alcohol was added to the precursor of the alumina group fibers. Then, this liquid was concentrated so that spinning liquid was made. By using the spinning liquid, spinning fibers were formed by a blowing spinning fibers treatment. The flow speed of the carrier gas (air) was 52 m/s and a supply rate of the spinning liquid was 5.3 ml/h.

After that, the blended precursors of the alumina group fibers were stacked so that a material sheet of the alumina group fibers was manufactured.

Next, the needling treatment was applied to the material sheet. A needle board where needles were provided at a density of 80/100 $cm^2$ was provided at only one side of the material sheet and the needling treatment was performed from a single side of the material sheet.

After that, continuous firing was applied to the obtained material mat at the highest temperature 1250° C. for one hour. Then, the obtained mat member having a thickness of 7.3 mm and a basic weight of 1400 $g/m^2$ was cut at dimensions of 100 mm×100 mm. In this example, an impregnating (saturating) treatment of the organic binder into the mat member is not performed.

Next, in order to receive the obtained mat member in the package member, the following operations were performed. Two PET sheets (thickness: 6.2 μm) having the same shape as that of the mat member but dimensions (length 1200 mm×width 120 mm) larger than those of the mat member were prepared. Two sheets were stacked so that positions of the sheet were consistent. The mat member was provided between the sheets so that the mat member was situated in the center part of the sheets. In this sandwiched state, by using a sealer apparatus (FV-801 manufactured by Hakko Corporation), end parts of the sheets were heat sealed over the entire circumference. As a result of this, a sample 600 of a mat product shown in FIG. 7 where a mat member 30S is received in a package member 120S was obtained. Next, holes for gas communication were formed at several positions (positions indicated by arrows E through H shown in FIG. 7) of a connecting part 135S surrounding the mat member and having dimensions larger than those of the mat member. The diameters of the holes were in a range between approximately 1 mm through approximately 5 mm.

The sample of the mat product manufactured by the above-mentioned method is regarded as the example 1.

Example 2

A mat product sample of an example 2 was manufactured by the same method as that for the example 1. However, manufacturing conditions of the example 2 were different from those of the example 1 in that a high density polyethylene having thickness of 10 μm was used as the material of the package member in the example 2. Other manufacturing conditions of the example 2 were the same as those of the example 1.

Comparative Example 1

A mat product sample of a comparative example 1 was manufactured by the same method as that for the example 1 except the following points. In the comparative example 1, firing was applied to the mat member and then an organic binder was blown onto the entire exposed surface of the mat member. As the organic binder, acrylic latex emulsion was used. The blown amount of the organic binder (target value) was 5 wt % relative to the total weight of the mat member including the organic binder. In the comparative example 1, the package member was not used.

The sample of the mat member of the comparative example 1 was obtained via the above-mentioned method.

Comparative Example 2

A mat member of a comparative example 2 was manufactured by the same method as that for the comparative example 1 except the following points. In the comparative example 2, firing was applied to the mat member and then the organic binder was impregnated (saturated) in the mat member. As the organic binder, acrylic latex emulsion was used. The impregnated (saturated) amount of the organic binder (target value) was 10 wt % relative to total weight of the mat member including the organic binder. In the comparative example 2, the package member was not used.

The sample of the mat member of the comparative example 2 was obtained via the above-mentioned method.

Comparative Example 3

A mat member of a comparative example 3 was manufactured by the same method as that for the comparative example 1 except the following points. In the comparative example 3, firing was applied to the mat member and then the organic binder was impregnated (saturated) into the mat member. As the organic binder, acrylic latex emulsion was used. The impregnated (saturated) amount of the organic binder (target value) was 11.5 wt % relative to the total weight of the mat member including the organic binder.

A polyethylene film having a thickness of 80 μm was adhered to a single surface having an area of 100 mm×100 mm of the obtained mat member.

The sample of the mat member of the comparative example 3 was obtained via the above-mentioned method.

Comparative Example 4

A mat member of a comparative example 4 was manufactured by the same method as that for the comparative example 1. In the comparative example 4, a vacuum pack treatment using an organic film was applied to the obtained method by using the following method.

First, the mat member was provided between two pieces of organic films (dimensions: 110 mm×110 mm). The organic film had a triple layers structure of PET layer/SiO$_2$ evaporation layer (100 nm)/PET layer. The full thickness of the organic film was 100 μm. Outer periphery parts of two organic films were thermally adhered by using the sealer apparatus. At this time, a space in the organic film was evacuated to a vacuum degree of 66.661 kPa (500 mmHg). As a result of this, the organic film was vacuum-adhered on each exposed surface of the mat member. In the comparative example 4, the organic binder was not included in the mat member.

The sample of the mat member of the comparative example 4 was obtained via the above-mentioned method.

The following table 1 shows specifications of the samples of the examples 1 and 2 and the comparative examples 1 through 4.

TABLE 1

| | SPECIFICATION OF MAT PRODUCT (OR MAT MEMBER) | | | | | |
|---|---|---|---|---|---|---|
| SAMPLE | "YES OR NO" REGARDING EXISTENCE OF ORGANIC BINDER IN MAT MEMBER (IMPREGNATING (SATURATING) TARGET AMOUNT) | "YES OR NO" REGARDING EXISTENCE OF PACKAGE MEMBER | MATERIAL OF PACKAGE MEMBER (THICKNESS) | OTHERS | SCATTERING RATIO OF INORGANIC FIBERS (%) | AMOUNT OF DISCHARGED ORGANIC COMPONENTS (%) |
| EXAMPLE 1 | NO | YES | PET (6.2 μm) | — | 0.007 | 1.5 |
| EXAMPLE 2 | NO | YES | HDPE (10 μm) | — | 0.008 | 1.5 |
| COMPARATIVE EXAMPLE 1 | YES (5 wt %)* | NO | — | *ORGANIC BINDER IS PROVIDED BY SPRAY APPLICATION | 0.035 | 5.0 |
| COMPARATIVE EXAMPLE 2 | YES (10 wt %)** | NO | — | **ORGANIC BINDER IS PROVIDED BY IMPREGNATING (SATURATING) METHOD | 0.030 | 9.9 |
| COMPARATIVE EXAMPLE 3 | YES (11.5 wt %)** | NO | — | **ORGANIC BINDER IS PROVIDED BY IMPREGNATING (SATURATING) METHOD POLYETHYLENE FILM (THICKNESS: 80 μm) IS PROVIDED ON A SINGLE SURFACE OF MAT MEMBER | 0.031 | 11.3 |
| COMPARATIVE EXAMPLE 4 | NO | NO | — | ORGANIC FILM (THICKNESS: 100 μm) IS PROVIDED ON ENTIRE EXPOSED CIRCUMFERENTIAL SURFACE OF MAT MEMBER | 0.007 | 17.7 |

(Scattering Test of Inorganic Fibers)

Figure 8:
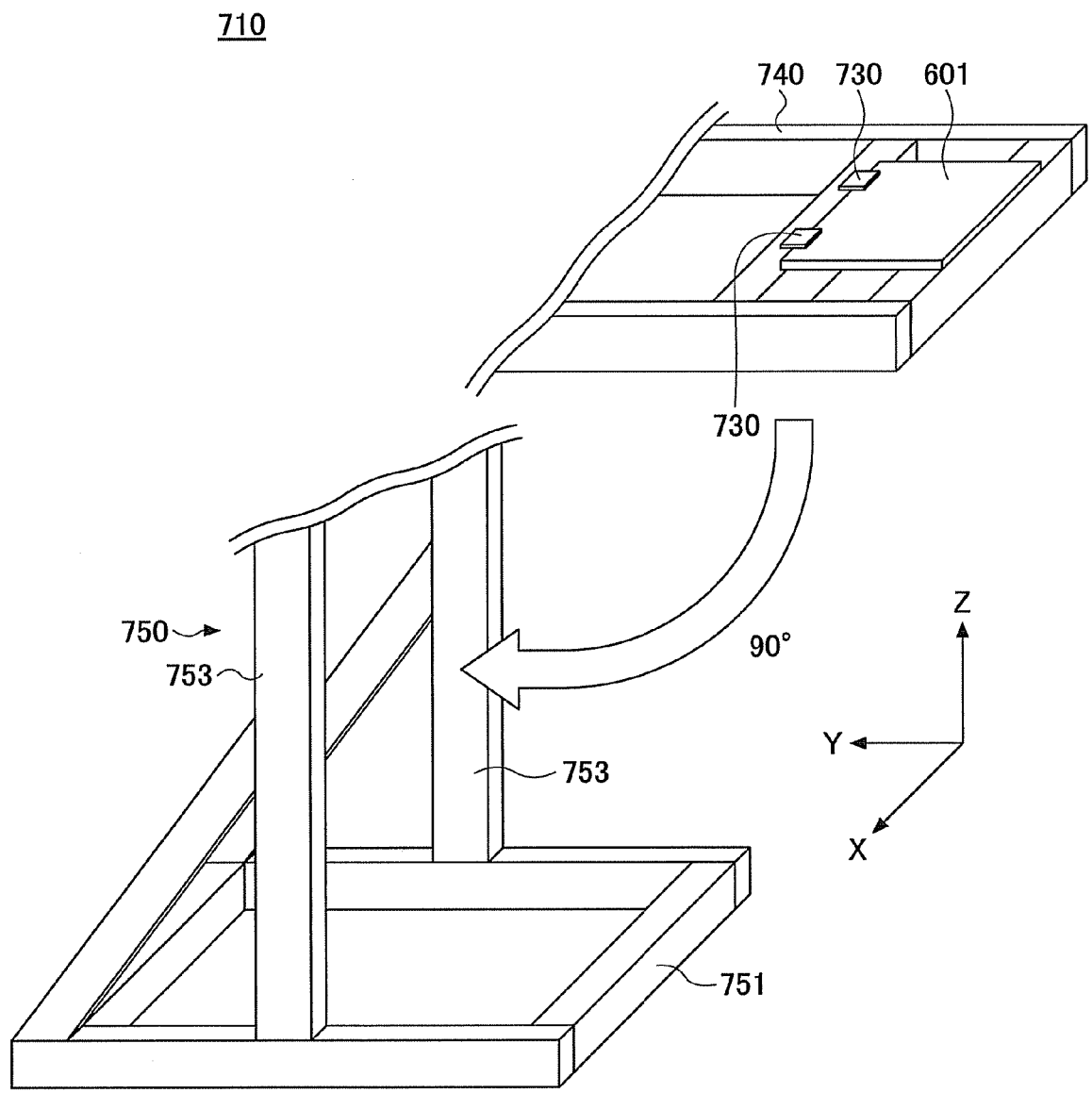
FIG. 8 is a schematic view showing a part of a dust scattering testing apparatus of an inorganic fiber.

A scattering test of the inorganic fibers is performed by using each of the above-mentioned samples. A part of the test apparatus is shown in FIG. 8.

The scattering test was performed as follows. As shown in FIG. 8, each of the samples 601 (the package member is not illustrated in FIG. 8) was fixed to a head end of an arm frame 740 (full length: 915 mm, width: 2 mm) projecting from a testing apparatus 710 by using two clips 730. Another head end of the arm frame 740 was connected to a vertical frame 750 of the testing apparatus 710. The vertical frame 750 stood on a base frame part 751. The vertical frame 750 had a main plane X-Z surface having an area (a length in a Z-direction excluding a height of the base frame part 751: 1016 mm, a length in an X direction: 322 mm). Two metal pillars 753 forming the vertical frame 750 had a width in the X-direction of 25 mm and a width in Y-direction of 25 mm. The arm frame 740 could be rotated in a plane (Y-Z plane) perpendicular to the main surface of the vertical frame 750 where a head end part connected to an upper end (not shown in FIG. 8) of the vertical frame 750 was a fulcrum. This rotation could be performed in an angle range, at least equal to or less than 90 degrees from the main surface of the vertical frame 750. At the time of testing, when the arm frame 740 fell from a horizontal state where the arm frame 740 was held at 90 degrees from a vertical direction, the arm frame 740 was rotated along the YZ plane surface at 90 degrees in a direction indicated by an arrow so that the sample 601 was also rotated in the direction indicated by the arrow. The arm frame 740 finally collided with the metal pillars 753 of the vertical frame 750. Based on an impact at this time, a part of the inorganic fibers was scattered from the sample 601. After the test, the sample 601 was gently taken out from the clips 130. Then, the scattering ratio of the inorganic fibers was calculated by using the following formula.

Scattering ratio of the inorganic fibers (%)={(the weight of sample before the test−the weight of sample after the test)/(the weight of sample before the test)}×100  Formula (1)

Figure 9:
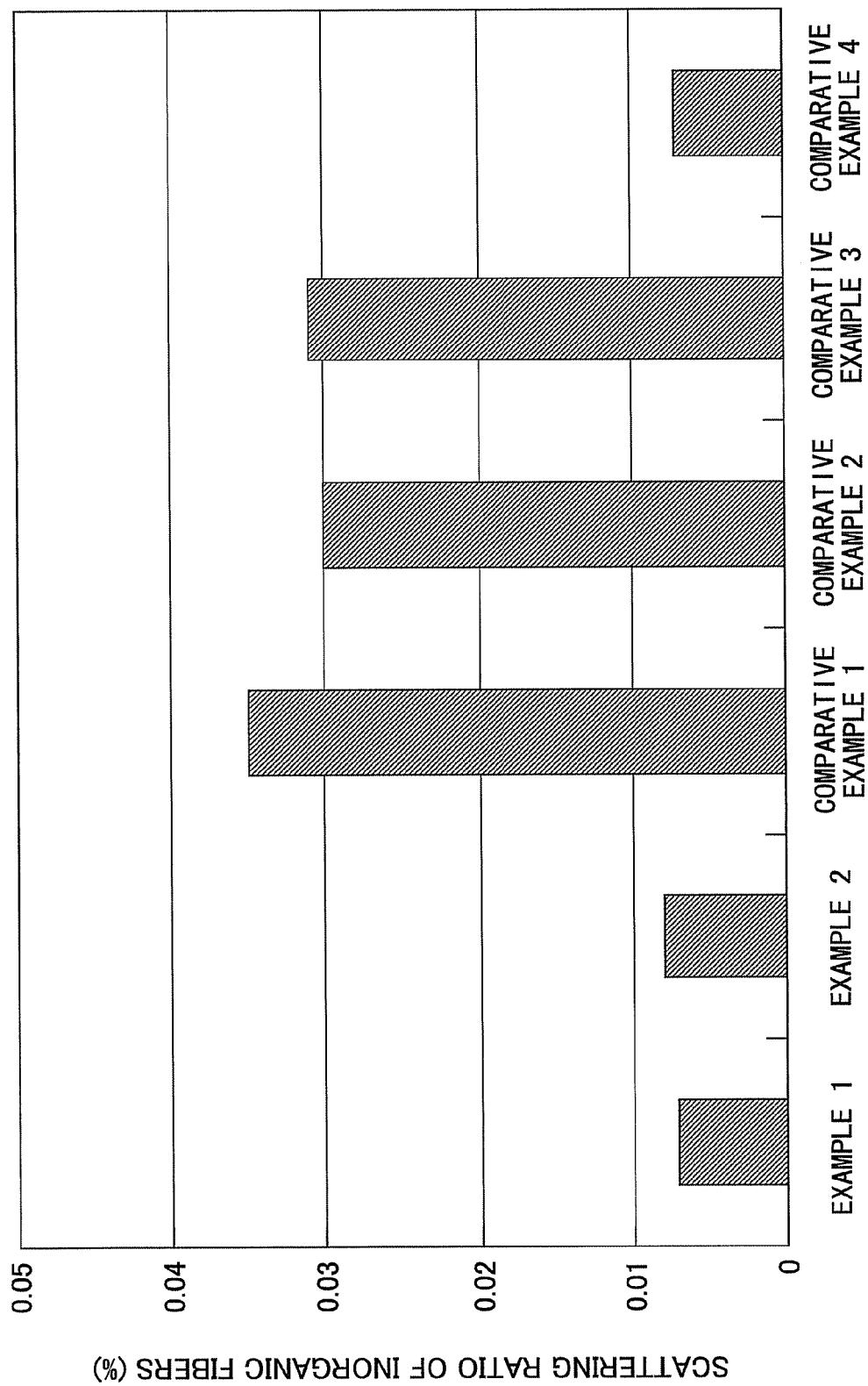
FIG. 9 is a graph showing a dust scattering ratio of the inorganic fiber of each sample of examples 1 and 2 and comparative examples 1 through 4.

Results of the scattering tests performed for the samples are shown in the above table 1 and FIG. 9. Through these results, it was found that the scattering ratios of the inorganic fibers are made small in the samples of the examples 1 and 2 compared to the comparative examples 1 through 3. In the comparative example 4, since the entire exposed surface of the mat member was vacuum-adhered by the organic film, the scattering ratio of the inorganic fibers was low, as well as the samples of the examples 1 and 2 where the mat members were received in the package members.

(Measurement of Amount of Discharged Organic Components)

The amount of organic components discharged from the samples of the examples 1 and 2 and the comparative examples 1 through 4 at the time of being held at high temperature were measured. The amounts of discharged organic components were measured as follows.

After each sample was dried at 110° C. for one hour, the weight (mg) of the sample was measured (the weight before firing). Then, firing at 600° C. for one hour was applied to each sample. After that, the temperature was decreased to room temperature and then the weight (mg) was measured again (the weight after firing). The amounts of organic components discharged from the samples were calculated by using obtained data and the following formula (2).

The amount of discharged organic components (%)={(the weight before firing−the weight after firing)/(the weight before firing)}×100  Formula (2)

Figure 10:
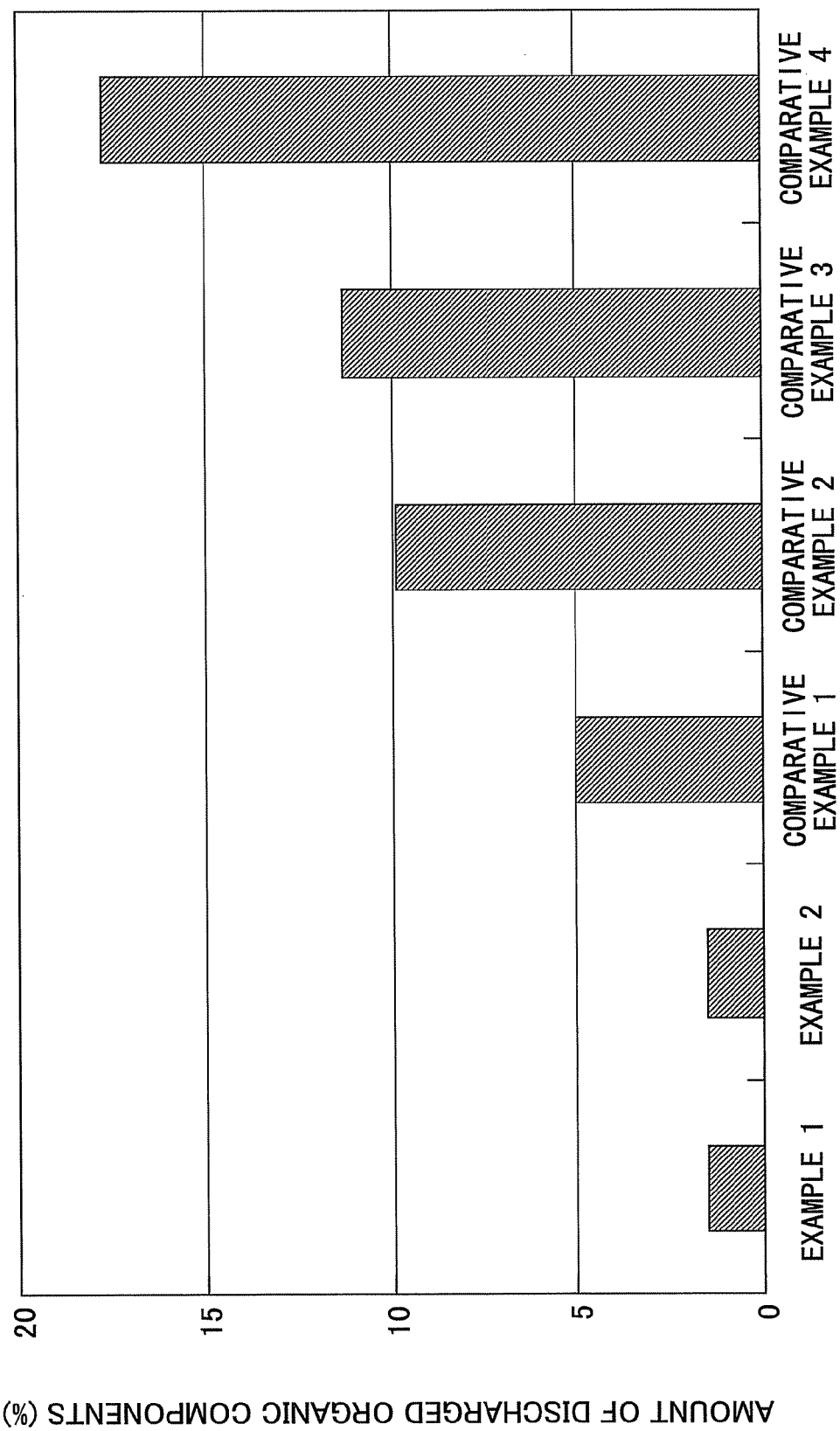
FIG. 10 is a graph showing the of amounts of discharged organic components of the examples 1 and 2 and the comparative examples 1 through 4.

The measurement results of the amounts of discharged organic components relative to the mat member are shown in the above table 1 and FIG. 10. From these results, in the samples of the examples 1 and 2 compared to the comparative examples 1 through 4, it was found that the amount of discharged organic components is effectively made low. In the samples of the examples 1 and 2 compared to especially the comparative example 4, the amounts of discharged organic components were decreased to approximately ⅒ (one tenth).

Thus, it was found that it is possible to provide the mat product 100 whereby, compared to a conventional mat member, scattering of inorganic fibers may not be generated and the amount of discharged organic components can be made small, according to the embodiment of the present invention.

(Pushing Load Evaluation Test)

A pushing load evaluation test was performed by using the samples of the example 1 and the comparative examples 2 and 3. These samples were made by cutting the mat members so as to have the configuration shown in FIG. 1. A full length Lm of the mat member was 270 mm and a width Wm of the mat member was 85 mm. In the sample of the example 1, the mat member was received in the package member having dimensions (full length L6: 290 mm, width Wr: 85 mm) larger than those of the mat member, so that the mat product had a configuration shown in FIG. 1.

The pushing load evaluation test was performed by using an Instron 5567 measuring apparatus manufactured by Instron Corporation. This apparatus had a head having a diameter of 40 mm and the maximum load which can be applied by this head was 30 kN.

The pushing load was measured by the following method. First, each sample was wound with respect to an external circumferential surface of a cylindrical shaped exhaust gas treating part (full length: 95 mm) having an external diameter of 80 mm. A concave part and a convex part of end parts of the mat member were engaged with each other so that the sample was fixed to the external circumferential surface of the exhaust gas treating part. Next, the exhaust gas treating part where the sample was wound was provided in a cylindrical shaped case having an internal diameter of 88 mm and a full length of 115 mm, so that two opening surfaces of the exhaust gas treating part were exposed. The case includes a mechanism for increasing the temperature, such as a heater.

Next, the case was provided at the measuring apparatus where the case stood (the opening surface of the exhaust gas treating part is in a horizontal state) and the head of the measuring apparatus fell from an upper part in a vertical direction, so that the head came in contact with the opening surface of the exhaust gas treating part. The head was moved downward in the vertical direction at a speed of 0.05 mm/minute, so that a shearing force was applied between the sample and the exhaust gas treating part. By these operations, a load generated at the time when the heads moved was continuously measured.

In this evaluation test, when the measured load value became a fixed value (when the sample started moving relative to the exhaust gas treating part; the measured load value at this time is hereinafter called an "initial load value"), the temperature of the case started being increased and a change of the measured load value by the temperature was measured. The rate of increase of the temperature was 15° C./minute.

In such a measurement, normally, the measured load value is initially decreased with time (and temperature). After the measured load value reaches a minimum vale, the measured load value may be increased. This phenomenon is discussed below. When the temperature is increased so that the organic component included in the sample starts being melted, a friction force between the sample and the exhaust gas treating part is reduced due to this melting. Accordingly, in an initial stage, the measured load value is gradually decreased. As the temperature increases, the melt of the organic component depending on the sample starts evaporating. Therefore, as the amount of melt is decreased, the friction force between the sample and the exhaust gas treating part is improved again so that the measured load value is increased. After that, when the organic component is completely evaporated, the measured load value becomes a substantially fixed value.

A pushing load decrease ratio of each sample was calculated by using the following formula based on change of the obtained measured load value in the measurement.

Pushing load decrease ratio (%)={(initial load value (N)−minimum load value (N))/(initial load value (N))}×100  Formula (3)

Figure 11:
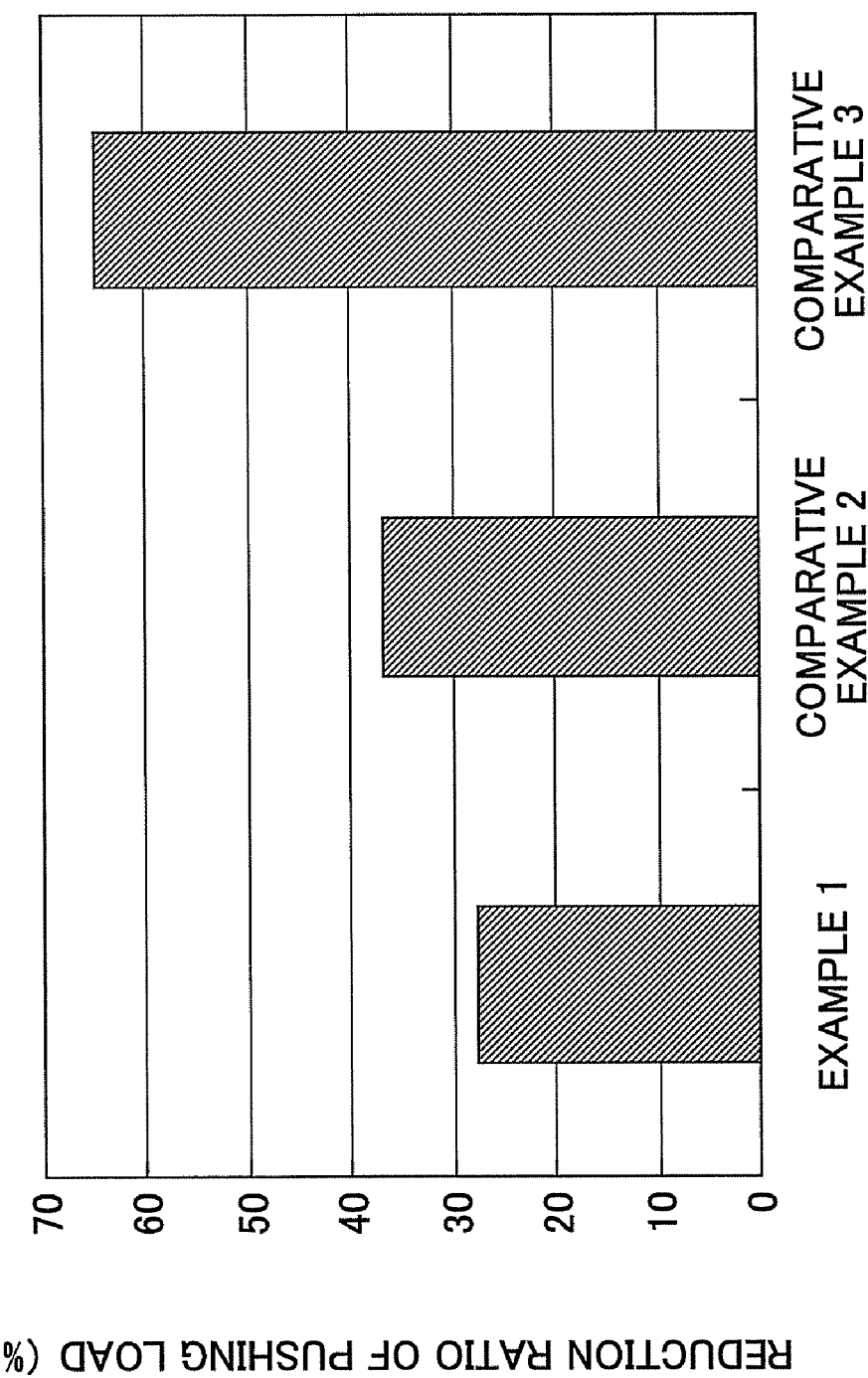
FIG. 11 is a graph showing measuring results of a reduction ratio of a pushing load of each sample of example 1 and the comparative examples 3 and 4.

Results of the calculation are shown in FIG. 11. As shown in FIG. 11, it was found that the pushing load decrease ratio of the sample of the example 1 was smaller that those of other samples. This is because the amount of the organic components included in the sample of the example 1 is small and therefore a time period during which the melt of the organic component exists between the mat member and the exhaust gas treating part is short. In other words, in the mat product 100 of the embodiment of the present invention, even if the melt of the organic component is generated between the mat member 30 and the exhaust gas treating part 220 due to melting of the package member under the high temperature atmosphere, the melt immediately disappears before the holding force of the mat member relative to the exhaust gas treating part 220 is drastically reduced so that the reduction of the holding force of the mat member 30 is effectively prevented.

Accordingly, in a case where the mat product 100 of the embodiment of the present invention is used as the holding seal member 240 of the exhaust gas treating apparatus, it is possible to obtain an additional effect where an exhaust gas treating apparatus which may not cause a position shift of the holding seal member 240 relative to the exhaust gas treating part 220 can be provided.

Example 3

A mat product sample of an example 3 was manufactured by the same method as that for the example 1. However, manufacturing conditions of the example 3 were different from those of the example 1 on the following points. That is, in example 3, a mat member (Lm=270 mm, Wm=85 mm) having a configuration shown in FIG. 1 was used. As material of the package member, two pieces of sheets which were a PET sheet (thickness: 6.2 µm) and an unwoven sheet (thickness: approximately 340 µm) were prepared. These sheets were cut so as to have configurations corresponding to the configuration of the mat member and dimensions (Lr=290 mm, Wr=90 mm) greater than that of the mat member. A triple layers structure of LDPE (linear LDPE)/PET/LDPE (linear LDPE) was applied to the unwoven sheet.

Two sheets were stacked so that positions of the sheet were consistent. The mat member was provided between the sheets so that the mat member was situated in the center part of the sheets. In this sandwiched state, by using a sealer apparatus (FV-801 manufactured by Hakko Corporation), end parts of the sheets were heat sealed over the entire circumference.

After that, holes for gas communication were formed at several positions (positions indicated by arrows A through D shown in FIG. 1) of a connecting part. The diameters of the holes were in a range between approximately 1 mm through approximately 5 mm.

Other conditions of the example 3 were the same as the example 1.

Figure 12:
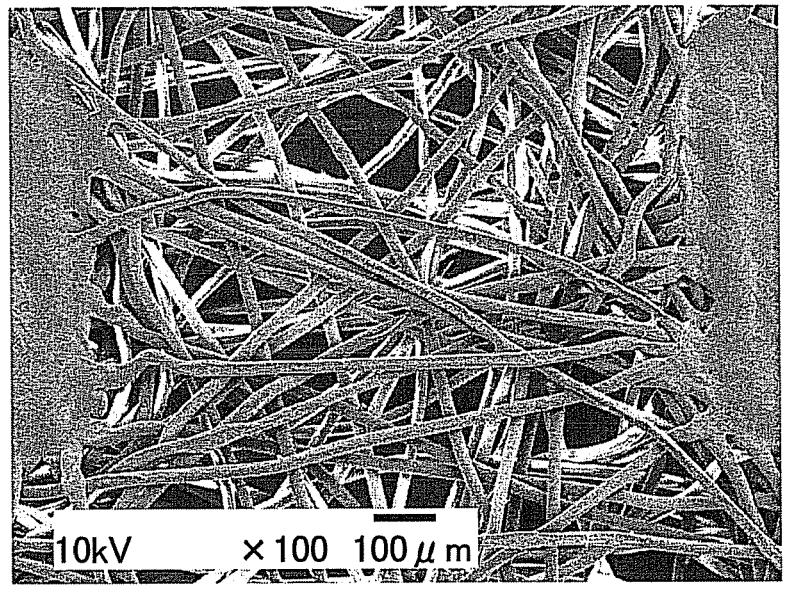
FIG. 12 is an electron microscope photograph of a surface of a package member of sample of the example 3.

FIG. 12 is an electron microscope photograph of a surface of the unwoven sheet of the obtained mat product sample of the sample of the example 3. It was found, through FIG. 12, a main surface at the unwoven sheet side of the mat product of the example 3 had a large number of minute concavoconvexs due to unwoven fibers.

Example 4

A mat product sample of an example 4 was manufactured by the same method as that for the example 3. However, manufacturing conditions of the example 4 were different from those of the example 3 in that two pieces of HDPE sheets (Lr=290 mm, Wr=90 mm, thickness: approximately 15 µm) were used in the example 4.

After that, by the same method as the example 3, two HDPE sheets were heat sealed so that the mat product sample where the mat member was received in the package member having holes for air communication was obtained.

Next, heat treatment was applied to the entire main surface (a part corresponding to an original single piece of the HDPE sheet) of the package member. The heat treatment was performed on the surface for 30 seconds by flowing hot air with a heat drier. As a result of this, a micro concavoconvex was formed on the main surface of the package member.

Figure 13:
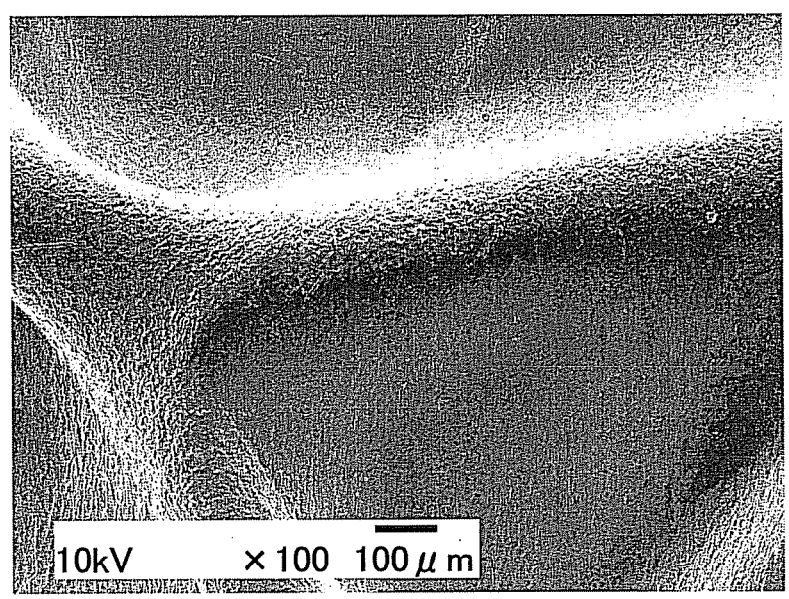
FIG. 13 is an electron microscope photograph of a main surface, where heat treatment is applied, of a package member of the sample of the example 4.
Figure 14:
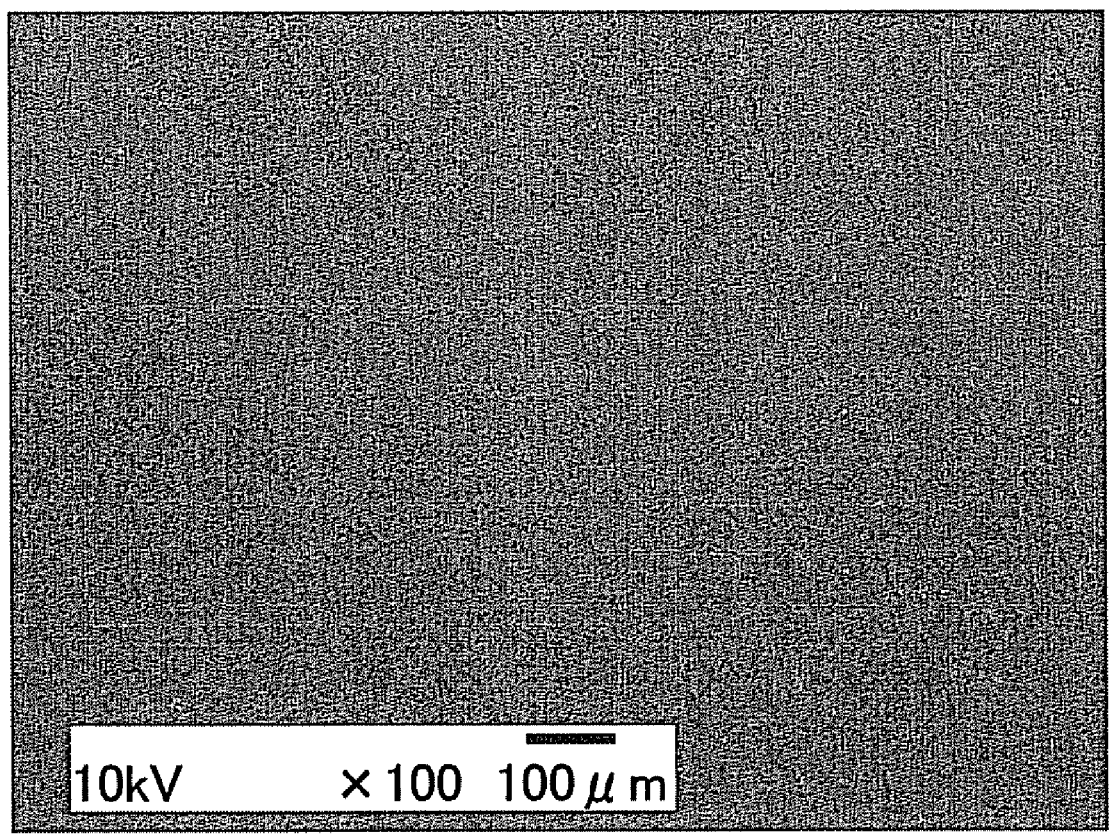
FIG. 14 is an electron microscope photograph of a main surface, where heat treatment is not applied, of a package member of the sample of the example 4.

FIG. 13 and FIG. 14 show electron microscope photographs of the main surface the package member of the sample of the example 4. FIG. 13 shows the main surface of the package member where the heat treatment was applied. FIG. 14 shows the main surface of the package member where the heat treatment was not applied. By comparing FIG. 13 and FIG. 14, it was found that a micro concavoconvex (difference of micro concavoconvex was approximately 100 µm through approximately 300 µm) was formed on the surface of the HDPE sheet by the heat treatment. The width of a single convex part was approximately 100 µm through approximately 300 µm.

(Holding Force Evaluation Test)

The holding force evaluation test was performed by using the samples of the examples 3 and 4.

The holding force evaluation test was performed by the following method. First, each sample was wound with respect to an external circumferential surface of a cylindrical shaped exhaust gas treating part (full length: 95 mm) having an external diameter of 80 mm. A concave part and a convex part of end parts of the mat member were engaged with each other so that the sample was fixed to the external circumferential surface of the exhaust gas treating part.

At this time, the sample was wound with respect to and fixed to the exhaust gas treating part, so that the unwoven side was situated inside in the sample of the example 3 and a main surface side where the heating treatment was applied was situated inside in the sample of the example 4. In any case, the sample was fixed to the exhaust gas treating part so that a distance from one end part of the exhaust gas treating part to an end part of the sample neighboring to the end part is substantially equal to a distance from another end part of the exhaust gas treating part to an end part of the sample neighboring the end part.

FIG. 15 is an electron microscope photograph of an external circumferential surface of the exhaust gas treating part. As shown in FIG. 15, it was found that a large number of extremely minute concavoconvexs are formed on the external circumferential surface of the exhaust gas treating part.

Next, a shift amount from a designated position of the sample at the time when the exhaust gas treating part where the sample was wound was manually press fitted in a cylindrical shaped case having an internal diameter of 88 mm and a full length of 115 mm so that the exhaust gas treating part inserted in the designated position was measured. In this test, as the measured shift amount is smaller, a better holding force relative to the exhaust gas treating part is provided.

As the result of the measurement, the shift amount in the sample of the example 3 was 3 mm. In addition, the shift amount in the sample of the example 4 was 5 mm. Thus, it was confirmed that a good holding force relative to the exhaust gas treating part could be obtained by making coefficients of friction at a side of the package member coming in contact with the exhaust gas treating part greater.

The mat product of the embodiment of the present invention can be used as the holding seal member or the like of the exhaust gas treating apparatus used for automobiles or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. A mat product, comprising:
a mat member including inorganic fibers and having a full length Lm; and
a package member having a full length Lr,
wherein the mat member is received in an inside space of the package member,
the inside space of the package member is in gas-communication with an outside environment, and
the full length Lr of the package member is greater than the full length Lm of the mat member and thereby the mat member can move in the inside space along a full length direction,
wherein the inside space is in gas-communication with the outside environment via one or more opening parts which are provided in the package member and have a dimension in a range between approximately 0.1 mm through approximately 5.0 mm,
wherein the mat member includes a first surface and a second surface situated at a side opposite to the first surface,
the package member includes a first side facing the first surface and a second side facing the second surface, and
outside surfaces of the first side and the second side of the package member have coefficients of friction substantially different from each other.

2. The mat product as claimed in claim 1,
wherein the inside space of the package member is surrounded by a connecting part.

3. The mat product as claimed in claim 2,
wherein the connecting part has, as seen in a direction parallel with a thickness direction of the mat member, a substantially rectangular-shaped, square-shaped, circular-shaped, or elliptic-shaped configuration, or a substantially rectangular-shaped configuration where a concave part and a convex part are respectively provided at sides facing each other.

4. The mat product as claimed in claim 2,
wherein the connecting part has, as seen in a direction parallel with a thickness direction of the mat member, substantially the same configuration as a configuration of the mat member and dimensions greater than dimensions of the mat member.

5. The mat product as claimed in claim 1,
wherein the one or more opening parts are formed by opening a part of the connecting part.

6. The mat product as claimed in claim 1,
wherein a ratio of the full length Lr of the package member relative to the full length Lm of the mat member is in a range between approximately 110% through approximately 130%.

7. The mat product as claimed in claim 1,
wherein the mat member has a width Wm and the package member has a width Wr; and
a ratio of the width Wr of the package member relative to the width Wm of the mat member is in a range between approximately 100% through approximately 130%.

8. The mat product as claimed in claim 1,
wherein the package member is formed of a film including an organic material.

9. The mat product as claimed in claim 8,
wherein the film includes at least one material selected from a group consisting of PET (polyethylene terephthalate), polypropylene, and polyethylene.

10. The mat product as claimed in claim 8,
wherein the amount of the organic material included in the package member relative to a sum of a weight of the mat member and a weight of the package member is less than 9 wt %.

11. The mat product as claimed in claim 1,
wherein the outside surfaces of the first side and the second side of the package member are made of different materials.

12. The mat product as claimed in claim 11,
wherein at least the outside surface of the first side of the package member is made of a nonwoven fabric.

13. The mat product as claimed in claim 1,
wherein the outside surface of the first side of the package member is micro concave and convex.

14. The mat product as claimed in claim 1,
wherein at least the outside surface of the second side of the package member is macro concave and convex.

15. The mat product as claimed in claim 14,
wherein at least one treatment among an embossing process, a corona process, and a waveform process is applied to the outside surface of the second side of the package member.

16. The mat product as claimed in claim 1,
wherein the mat member does not include a substantial organic component.

17. The mat product as claimed in claim 1,
wherein the mat member includes at least one selected from a group consisting of an alumina fiber, a mullite fiber, a silica alumina fiber, a glass fiber, a rock wool, and a bio-soluble fiber.

18. The mat product as claimed in claim 1,
wherein the mat member is formed by stacking a plurality of mat materials.

19. An exhaust gas treating apparatus, comprising:
an exhaust gas treating part having two opening surfaces via which exhaust gas is communicated;
a holding seal member wound with respect to at least a part of an external circumferential surface of the exhaust gas treating part except the opening surfaces; and
a cylindrical-shaped member configured to receive the exhaust gas treating part where the holding seal member is wound,
wherein the holding seal member includes the mat product claimed in claim 1.

20. The exhaust gas treating apparatus as claimed in claim 19,
wherein the exhaust gas treating part is a catalyst carrier or an exhaust gas filter.

21. A muffler apparatus, comprising:
an inner pipe;
an outer shell configured to cover an outside of the inner pipe; and
an acoustical material provided between the inner pipe and the outer shell,
wherein the acoustical material includes the mat product claimed in claim 1.

22. An exhaust gas treating apparatus, comprising:
an exhaust gas treating part having two opening surfaces via which exhaust gas is communicated;
a holding seal member wound with respect to at least a, part of an external circumferential surface of the exhaust gas treating part except the opening surfaces; and a cylindrical-shaped member configured to receive the exhaust gas treating part where the holding seal member is wound, wherein the holding seal member includes a mat member including inorganic fibers;

the mat member is received in an inside space of a package member, the package member having a full length Lr, the inside space of the package member is in gas-communication with an outside environment, the full length Lr of the package member is greater than the full length Lm of the mat member and thereby the mat member can move in the inside space along a full, length direction, wherein the inside space is in gas-communication with the outside environment via one or more opening parts which are provided at any part of the package member and have a dimension in a range between approximately 0.1 mm through approximately 5.0 mm, wherein the mat member includes a first surface and a second surface situated at a side opposite to the first surface;

the package member includes a first part facing the first surface and a second part facing the second surface, a material of the first part of the package member has a coefficient of friction greater than a coefficient of friction of a material of the second part of the package member, and the holding seal member is wound with respect to the exhaust gas treating part so that the outside surface of the first side of the package member is situated at a side of the exhaust gas treating part.

* * * * *